(12) United States Patent
Raj et al.

(10) Patent No.: US 7,684,350 B2
(45) Date of Patent: Mar. 23, 2010

(54) METHOD AND APPARATUS FOR DISTRIBUTING LABELS IN A LABEL DISTRIBUTION PROTOCOL MULTICAST NETWORK

(75) Inventors: Alex E. Raj, Westford, MA (US); Eric C. Rosen, Arlington, MA (US); Robert H. Thomas, Lexington, MA (US); IJsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 427 days.

(21) Appl. No.: 11/377,807

(22) Filed: Mar. 16, 2006

(65) Prior Publication Data

US 2007/0217420 A1     Sep. 20, 2007

(51) Int. Cl.
  *H04L 12/28* (2006.01)
(52) U.S. Cl. .................................... 370/254; 370/401
(58) Field of Classification Search ......... 370/252–254, 370/389, 390, 392, 400, 401, 432
  See application file for complete search history.

(56) References Cited

U.S. PATENT DOCUMENTS

| | | | | |
|---|---|---|---|---|
| 5,845,087 | A * | 12/1998 | Trehus ........................ | 709/242 |
| 5,964,841 | A | 10/1999 | Rekhter | |
| 6,219,739 | B1 | 4/2001 | Dutt | |
| 6,374,303 | B1 * | 4/2002 | Armitage et al. ............. | 709/242 |
| 6,501,754 | B1 * | 12/2002 | Ohba et al. .................. | 370/389 |
| 6,512,768 | B1 | 1/2003 | Thomas | |
| 6,597,663 | B1 | 7/2003 | Rekhter | |
| 6,636,509 | B1 | 10/2003 | Hughes | |
| 6,879,594 | B1 * | 4/2005 | Lee et al. ..................... | 370/408 |
| 6,970,464 | B2 | 11/2005 | Xu | |
| 2004/0205215 | A1 | 10/2004 | Kouvelas | |
| 2005/0131912 | A1 | 6/2005 | Lin | |
| 2005/0213525 | A1 | 9/2005 | Grayson | |
| 2006/0013141 | A1 * | 1/2006 | Mutoh et al. ................. | 370/241 |
| 2006/0034251 | A1 | 2/2006 | Sirabalan | |

OTHER PUBLICATIONS

Cisco Technology, Inc., et al., International Application No. PCT/US07/64025, International Filing Date: Mar. 15, 2007, "PCT Notification of Transmittal of the International Search Report and the Written Opinion of the International Searching Authority, or the Declaration", Date of Mailing: May 21, 2008, 7 pages.

Rosen, E., RFC 3031, entitled Multiprotocol Label Switching Architecture, IETF, Jan. 2001, pp. 1-57.

Internet Protocol Multicast, Cisco Systems, Inc., Feb. 20, 2002, pp. 1-16.

(Continued)

*Primary Examiner*—Hong Cho
(74) *Attorney, Agent, or Firm*—Cesari and McKenna, LLP

(57) ABSTRACT

A method of distributing labels in a label distribution protocol multicast network having a root node and at least one leaf node comprises the steps, performed at a receiving node, of receiving a label and path vector from a distributing node, carrying out loop or convergence detection from the received path vector and, if convergence or no loop is detected, sending a receiving node label and path vector to its nexthop node in the network.

21 Claims, 21 Drawing Sheets

OTHER PUBLICATIONS

Minei, I., et al., Network Working Group Internet Draft, entitled Label Distribution Protocol Extensions for Point-to-Multipoint and Multipoint-to-Multipoint Label Switched Paths (draft-minei-wijnands-mpls-ldp-p2mp-00), IETF, Oct. 14, 2005, pp. 1-19.

Wijnands, IJsbrand et al., Network Working Group Internet Draft, entitled Multicast Extensions for LDP (draft-wijnands-mpls-lsp-mcast-ext-00.txt, IEFT, Mar. 2005, pp. 1-12.

* cited by examiner

```
┌─────────────────────────────────────┐
│   R4 SENDS MULTICAST TRAFFIC WITH L5 │
│                 400                  │
└─────────────────────────────────────┘
                  │
                  ▼
┌─────────────────────────────────────┐
│       R3 CARRIES OUT RPF CHECK       │
│                 402                  │
└─────────────────────────────────────┘
                  │
                  ▼
┌─────────────────────────────────────┐
│ R3 SENDS TO R1 AND R2 ALONG S0, S1 WITH L1, L2 │
│                 404                  │
└─────────────────────────────────────┘
```

FIG. 4

```
┌─────────────────────────────────────┐
│      R2 SENDS LABEL WITHDRAW TO R3   │
│                 500                  │
└─────────────────────────────────────┘
                  │
                  ▼
┌─────────────────────────────────────┐
│           R3 DELETES LABEL           │
│                 502                  │
└─────────────────────────────────────┘
                  │
                  ▼
┌─────────────────────────────────────┐
│      R3 SENDS LABEL RELEASE TO R2    │
│                 504                  │
└─────────────────────────────────────┘
```

FIG. 5

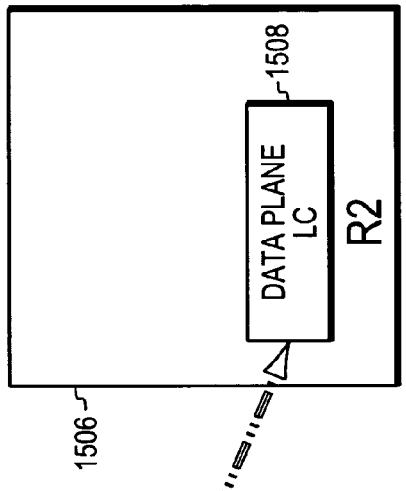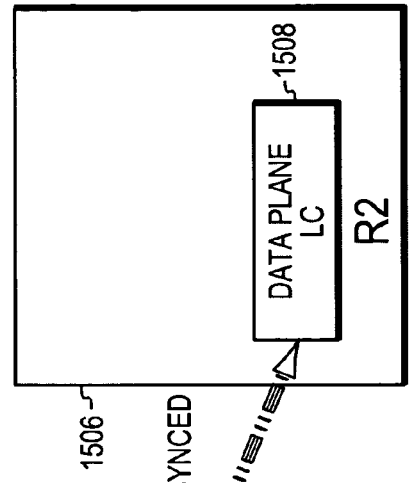
FIG. 15A
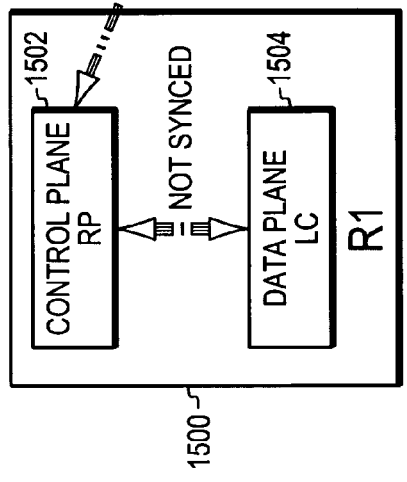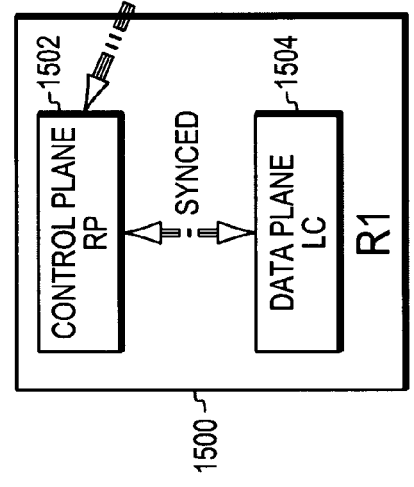
FIG. 15B

METHOD AND APPARATUS FOR DISTRIBUTING LABELS IN A LABEL DISTRIBUTION PROTOCOL MULTICAST NETWORK

BACKGROUND OF THE INVENTION

1. Field of the Invention

The present invention generally relates to distribution of labels, for example, Multi Protocol Label Switching (MPLS) labels. The invention relates more specifically to a method and apparatus for distributing labels in a Label Distribution Protocol (LDP) multicast network.

2. Background Information

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source is to a destination via a network of elements including links (communication paths such as telephone or optical lines) and nodes (for example, routers directing the packet along one or more of a plurality of links connected to it) according to one of various routing protocols.

MPLS is a protocol that is well known to the skilled reader and which is described in document "Multi Protocol Label Switching Architecture" which is available at the time of writing on the file "rfc3031.txt" in the directory "rfc" of the domain "ietf.org" on the World Wide Web. According to MPLS, a path for a source-destination pair is established, and values required for forwarding a packet between adjacent routers in the path together with headers or "labels" are prepended to the packet. The labels are used to direct the packet to the correct interface and next hop. The labels precede the IP or other header allowing smaller outer headers.

The path for the source-destination pair, termed a Label Switched Path (LSP) can be established according to various different approaches. One such approach is Label Distribution Protocol (LDP) in which each router in the path sends its label to the neighbor routers according to its IP routing table. LDP labels are sent to the neighbor routers in a label mapping message which can include as one of its TLV (Type Length Value) fields a path vector specifying the LSP. For each LSP created, a forwarding equivalent class (FEC) is associated with the path specifying which packets are mapped to it. A Label Forwarding Information Base (LFIB) stores the FEC, the next-hop information for the LSP, and the label required by the next hop.

MPLS LDP approaches have further been applied to multicast networks. Conventionally multicast networks rely on unicast routing protocols. Unicast routing protocol relies on a routing algorithm resident at each node. Each node on the network advertises the routes throughout the network. The routes are stored in a routing information base (RIB) and based on these results a forwarding information base (FIB) or forwarding table is updated to control forwarding of packets appropriately. When there is a network change, a notification representing the change is flooded through the network by each node adjacent the change, each node receiving a notification sending it to each adjacent node.

As a result, when a data packet for a destination node arrives at a node, the node identifies the optimum route to that destination and forwards the packet via the correct interface to the next node ("NEXT_HOP") along that route. The next node repeats this step and so forth.

Link state protocols can support multicast traffic comprising point to multipoint traffic (P2MP) and multipoint to multipoint traffic (MP2MP). For example IP (internet protocol) multicast is well known to the skilled reader and is described in document "Internet Protocol Multicast" which is available at the time of writing on the file "IP multi.htm" in the directory "univercd/cc/td/doc/cisintwk/ito_doc" of the domain www.cisco.com of the World Wide Web.

Multicast allows data packets to be forwarded to multiple destinations (or "receivers") without unnecessary duplication, reducing the amount of data traffic accordingly. All hosts wishing to become a receiver for a multicast group perform a "join" operation to join the multicast group. A multicast tree such as a shortest path trees is then created providing routes to all receivers in the group. The multicast group in a P2MP group is denoted (S,G) where S is the address of the source or broadcasting host and G is an IP multicast address taken from a reserved address space. As a result routers receiving a packet from the source S to the multicast address G send the packet down each interface providing a next hop along the route to any receiver on the tree.

In the case of MP2MP multicasts, a shared group is denoted (*,G) allowing multiple sources to send to multiple receivers. The multicast tree is constructed as a shared tree including a shared root or rendezvous point (RP).

During forwarding of multicast data at a router, when a packet is received at the router with a multicast address as destination address, the router consults the multicast forwarding table and sends the packet to the correct next hop via the corresponding interface. As a result, even if the path from the next hop subsequently branches to multiple receivers, only a single multicast packet needs to be sent to the next hop. If, at the router, more than one next hop is required, that is to say the multicast tree branches at the router, then the packet is copied and sent on each relevant output interface.

In order to avoid looping, each router ensures that data is only sent away from the source and towards the receiver as otherwise traffic would loop back, which is impermissible in multicast. In order to achieve this the router carries out a reverse path forwarding (RPF) check to ensure that the incoming packet has arrived on the appropriate input interface. If the check fails then the packet is dropped. The routers uses the unicast forwarding table to identify the appropriate upstream and downstream interfaces in the tree as part of the RPF and only forwards packets arriving from the upstream direction.

Multicast methods which make use of existing forwarding information in this manner belong to the family of "protocol independent multicast" (PIM) methods as they are independent of the specific routing protocol adopted at each router.

More recently the use of MPLS multicast has been explored and in particular the use of LDP has been discussed for building receiver driven multicast trees. One such approach is described in Label Distribution Protocol Extensions for Point-to-Multi-point Label Switched Paths" of I. Minei et al., which is available at the time of writing on the file "draft-minei-wijnands-mpls-ldp-p2mp-00.txt" in the directory "wg/mpls" of the domain "tools.ietf.org".

The approach described therein can be understood further with reference to FIG. 1 which is a network diagram illustrating a P2MP network and FIG. 2 which is a flow diagram illustrating the steps involved in a node joining the network. The network shown in FIG. 1 is designated generally 100 and includes nodes comprising, for example routers R1, reference 102, R2, reference numeral 104, R3, reference numeral 106 and R4, reference numeral 108. Node R1, R2 and R4 are joined to node R3 via transit S0, S1, S2, reference numerals 110, 112, 114 respectively. Nodes R1 and R2 comprise leaf or receiver nodes which can receive multicast traffic from root node R4 via transit node R3.

Referring to FIG. 2, at step 200, receiver node R2 joins the multicast tree according to any appropriate mechanism, and obtains the relevant identifiers of the tree, namely the root node and the FEC of traffic belonging to the tree. It then creates an LDP path from the root R4. In particular, at step 202 R2 identifies its nexthop to the root of the tree for example from its IP forwarding table, in the present case, node R3. At step 204 node R2 constructs a P2MP label mapping message 116 indicating the multicast tree FEC (for example an identifier "200"), the root R4 of the multicast tree and the label it pushes to R3, label L2. In the case of a P2MP network the downstream direction for traffic is from R4 via R3 to R2 and hence the label mapping message is sent upstream from R2 to R3.

At step 206 node R3 similarly allocates a label L5 and updates its forwarding state such that incoming packets with label L5 will have the label swapped for label L2 and forwarded along interface S1 to R2. Node R3 further sends a P2MP label mapping message to node R4 indicating the FEC 200, the root R4 and its label L5 at step 208. At step 210 root node R4 updates its forwarding state with label L5 for the FEC 200. It will be noted that steps 200 to 210 are repeated for each leaf or receiver node joining the multicast tree. For example if node R1 joins the tree then it sends a P2MP label mapping message to R3 with FEC 200, route R4 and label L1. In this case, as is appropriate for multicast, R3 does not construct a further label to send to R4 but adds label L1 to the forwarding state corresponding to incoming packets with label L5.

P2MP LDP Multicast can be further understood with reference to FIG. 3 which shows the network of FIG. 1 with the datapath of multicast traffic, and FIG. 4 which comprises a flow diagram showing the steps performed in the forwarding operation. At step 400 the root node R4, acting as ingress node to the P2MP network, recognizes in any appropriate manner traffic for example ingress IP traffic for the multicast tree 100 and forwards the traffic shown as packet 300 to which the label L5 302 is appended to an IP payload 304. The forwarding table or multicast LFIB (mLFIB) 306 maintained at R3 for traffic incoming on interface S2 is shown in FIG. 3 for "down" traffic, that is, traffic from the route to the receivers. At step 402 node R3 carries out an RPF check to ensure that the incoming packet with label L5 arrived on the correct interface S2. If so, then at step 404, labels L1 and L2 are swapped for label L5 for forwarding along respective interfaces S0 and S1. As a result packets 308, 310 are sent to the respective receivers with the appropriate label appended to the payload.

Provision is also made for withdrawal of labels. For example referring to FIG. 5, which is a flow diagram illustrating the steps performed in a label withdrawal transaction, where a node for example node R2 wishes to leave the multicast tree then at step 500 it sends a label withdraw message to its nexthop neighbor R3. At step 502, node R3 deletes the relevant state for example label L2 and at step 504 R3 sends a label release message to R2. It will be noted that if node R1 also leaves the tree then node R3 will remove all of the state corresponding to FEC 200 and will send a label withdraw message to node R4.

FIG. 6 is a flow diagram illustrating the steps performed when a nexthop changes but without removal of any receiver node from the multicast tree. An example topology is shown in FIG. 7, which is a network diagram corresponding to FIGS. 1 and 3 but with an additional node R5 700 as node R3's nexthop to node R4, and an additional node R6 702 as an alternative nexthop for node R2 to node R4. Node R2's nexthop to node R4 will change if the link between node R5 and node R4 fails, and change to, for example, node R6.

In that case at step 600 node R2 sends a label withdraw message to node R3 and at step 602 node R2 clears the relevant entries in its mLFIB. At step 604 node R2 sends its new label for example L6 to node R6 following the label mapping procedures described above with reference to FIG. 2. At step 606 node R6 installs the label L6 and forwards a label mapping message to root R4 again in the manner described above.

It will be noted that LDP allocates a local label for every FEC it learns, and if the FEC is removed, the local label and an associated binding (i.e., remote corresponding labels) for the FEC are preserved for a timeout period. If the FEC is reinstated before the timeout expires, LDP uses the same local label binding for that FEC. Accordingly where there is a network change which changes the route of the multicast tree's unicast nexthop, the same local label binding is used and rewritten in an ingress interface independent manner such that the label rewrite is used on the data plane, i.e., in the mLFIB, before and after the network change.

In the case of an MP2MP multicast network, this is effectively treated as M individual P2MP networks in which each leaf can either be a receiver from the root node as with a P2MP network, or a sender of multicast traffic to the other leaves on the network. Because of this bi-directionality it will be noted that traffic can be considered as either "down traffic" i.e., from the root to the leaves acting as receivers, or "up traffic" in the form of traffic from the leaves, acting as senders, towards the root. Accordingly the direction of "upstream" and "downstream" traffic depends on whether it is "up traffic" in which case the downstream direction it towards the root, or "down" traffic in which case the downstream direction is away from the root. Further discussion of MP2MP multicast with LDP is provided in "Multicast Extensions for LDP" of Wijnands et al which is available at the time of writing on the file "watersprings.org/pub/id/draft-wijnands-mpls-ldp-mcast-ext-00.txt" in the directory "pub/ID" of the domain "watersprings.org" on the World Wide Web.

FIG. 8 is a network diagram showing an MP2MP network. The network shown is different to that shown in FIGS. 1 and 3 and hence different numbering is used although the nodes are named similarly. In particular the network is designated generally 800 and includes receiver/sender nodes R1, R2 reference numbers 802, 806, a transit node R3 reference number 808, a root node R4, reference numeral 810 and a further receiver/sender node R5, reference number 812. Nodes R1, R2 and R4 are joined to node R3 via respective interfaces S0, 814 S1, 816, and S2, 818. Node R4 is joined to node R5 by a further interface 53. It will be noted that the root node R4 is a shared root although it may in addition be an ingress or receiver or sender node as appropriate.

FIG. 9 is a flow diagram illustrating the manner in which a receiver/sender node for example node R2 joins an MP2MP multicast tree. At step 900 node R2 joins the tree and at step 902 node R2 identifies its nexthop to the root node R4, namely node R3, in the manner described above with respect to P2MP. At step 904 node R2 sends a "pseudo label mapping message" or pseudo label 820 to node R3. The request pseudo includes identification of the FEC 200, the root R4, and R2's ingress label L2. Accordingly the message is generally in the similar form to a P2MP label mapping message however it is termed here a pseudo label request label mapping message as it must be distinguishable from a standard P2MP label mapping message as described in more detail below. In practice, of course, the message can be recognizable as a pseudo label request message in any appropriate manner.

At step 906, node R3 recognizes the message as a pseudo label request message and sends a return MP2MP label mapping to node R2 identifying the FEC 200 and providing its own ingress label L3. As a result node R3 provides a label to node R2 for use with "up traffic" from R2 towards the route. At step 908 node R3 sends a pseudo label request message 824 to node R4 indicating the FEC 200, root R4 and node R3's ingress label L5. At step 910, node R4 sends its MP2MP label mapping 826 for up traffic to node R3 indicating FEC 200 and its ingress label L6.

It will be noted that each additional receiver/sender carries out the same procedure, for example node R1 will send a pseudo label request message 828 to node R2 indicating FEC 200, root R4 and label L1 and will receive a label mapping 830 from R3 indicating FEC 200 and label L4 for up traffic.

FIG. 10 is a network diagram corresponding to FIG. 8 and showing some of the forwarding state or mLFIB's constructed following the transactions described with reference to FIG. 9. In particular for down traffic at node R3, that is traffic arriving from root node R4 on interface S2, the forwarding table is shown at 840. Referring to FIG. 11 which is a flow diagram illustrating forwarding of MP2MP multicast traffic, at step 1100, traffic arriving with label L5 is RPF checked to ensure that it arrived on ingress interface S2. Then at step 1102 label L5 is replaced by label L1 and the traffic is forwarded on interface S0 to node R1. At step 1104 label L2 is added and the traffic forwarded interface S1 to node R2.

For up traffic from node R1 towards the root on interface S0 forwarding table 842 is shown and forwarding of such traffic at node R3 can be understood with reference to FIG. 12 which is a flow diagram illustrating forwarding of incoming traffic on interface S0. At step 1200 an RPF check is carried out on traffic with label L4 to ensure that it arrives on interface S0. At step 1202 traffic to node R4 is forwarded on interface S2 with label L6. It will be noted that this label is learnt from the MP2MP label mapping from node R4. At step 1204, label L2 is added for traffic on interface S1 for node R2. It will be noted that this forwarding information can be inherited from the downstream state table 840.

Table 844 shows the forwarding state for up traffic received at node R3 on interface S1 from node R2. FIG. 13 is a flow diagram illustrating the steps in forwarding said up traffic. At step 1300 an RPF check is carried out on traffic carrying label L3 to ensure that it arrived on interface S1. At step 1302 traffic towards the root R4 is forwarded on interface S2 with label L6 which again is learnt from the MP2MP label mapping from node R4. At step 1304 traffic for node R1 is forwarded on interface S0 with label L1 which again is inherited from the downstream state.

It will be noted that as a result of this arrangement, restricted label space is required and labels are reused where possible. In addition, information can be inherited from appropriate routing tables. Yet further, it will be seen that up traffic does not need to proceed all of the way to the root before it can be multicast to all other receivers, but can be forwarded at transit nodes as appropriate. For example traffic from node R1 acting as receiver to node R2 acting as sender is sent to R3 which then forwards it directly to node R2 rather than up to node R4 and back again.

A problem inherent in both unicast and multicast traffic is that of micro looping. In essence, micro loops occur when a network change takes place and nodes converge on the new network at different times. While the nodes are not all converged, there is a risk that one node will forward according to an old topology whereas another node will forward according to a new topology such that traffic will be sent back and forth between two or more nodes in a micro loop. In IP networks, transient micro loops can occur for example because of control plane inconsistency between local and remote devices (that is, for example, inconsistencies in the RIB), control and data plane inconsistency on a local device (that is inconsistencies between the RIB and the FIB if the FIB has not yet been updated), and inconsistencies on the data plane between local and remote devices, for example where the FIB or LFIB or respective nodes are converged on different topologies.

Transient micro loops are in fact common in IP networks, and in unicast IP routing the impact and number of devices affected is restricted. However, in the case of multicast networks there is the risk of exponential-traffic loops during convergence. For example, if there are 100,000 multicast trees through a multicast core router such R3 then during a network change, transient micro loops could bring down the entire network.

Other problems can arise as a result of re-using labels. Typically, on the control plane, a local label withdraw message is sent to the old nexthop and the same label may be distributed to the new nexthop. There is no strict timing for sending the label withdraws and releases and even if the withdraw message is sent to the old nexthop before the label mapping message is sent to the new nexthop, because of the asynchronous nature of the communication and processing of the node or router, the old nexthop may not have been updated before the new nexthop uses the label which can lead to a FIB/mLFIB inconsistency between local and remote devices for a period of time. In particular, because the local label is the same for the old and new trees, ingress traffic from the new tree could be forwarded to the old tree and traffic from the old tree could be forwarded to the new tree forming a transient micro loop. Similarly the reverse can take place whereby traffic from the old tree is forwarded to the new tree which is then forwarded back to the old tree to form a transient micro loop.

In fact, the problem is exacerbated as nodes do not withdraw or release their labels immediately but wait for the label hold down timer to expire, which again slows down the convergence process and increases the window in which errors can occur.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a flow diagram illustrating the steps involved in forwarding multicast data on a P2MP network;

FIG. 5 is a flow diagram illustrating the steps involved in a label withdraw session when a leaf leaves a P2MP network;

FIG. 15a is a schematic diagram showing a first circumstance in which the loops may occur in a network;

FIG. 15b is a schematic diagram showing a second circumstance in which looping may occur in a network;

DETAILED DESCRIPTION OF AN ILLUSTRATIVE EMBODIMENT

A method and apparatus for distributing labels in a label distribution protocol multicast network is described. In the following description, for the purposes of explanation, numerous specific details are set forth in order to provide a through understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of distributing labels in a label distribution protocol multicast network
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method of distributing labels in a label distribution protocol multicast network having a root node and at least one leaf node. The method comprises the steps, performed at a receiving node, of receiving a label and path vector from a distributing node, carrying out loop or convergence detection from the received path vector and, if convergence or no loop is detected, sending a receiving node label and path vector to its nexthop node in the network together with a path root.

The needs identified in the foregoing Background, and other needs and objects that will become apparent for the following description, are achieved in the present invention, which comprises, in one aspect, a method of forwarding data in a data communications network having a plurality of nodes.

2.0 Steuctural and Functional Overview

In overview a transient micro loop prevention technique for P2MP and MP2MP trees is provided in relation to both down and up traffic related micro loops. In particular an improved clean up procedure is provided according to which a node's local rewrites and mappings are cleared after every nexthop change removing local label and FEC mappings or bindings and label release and withdraw messages are sent for all local and remote labels, and an ordered mFIB/mLFIB installation is carried out using strict path vector-based ordered label distribution and/or rewrite installation procedures. In addition, old and new multicast LSPs are made disjoint by ensuring that new labels are assigned if the nexthop is changed.

Figure 1:
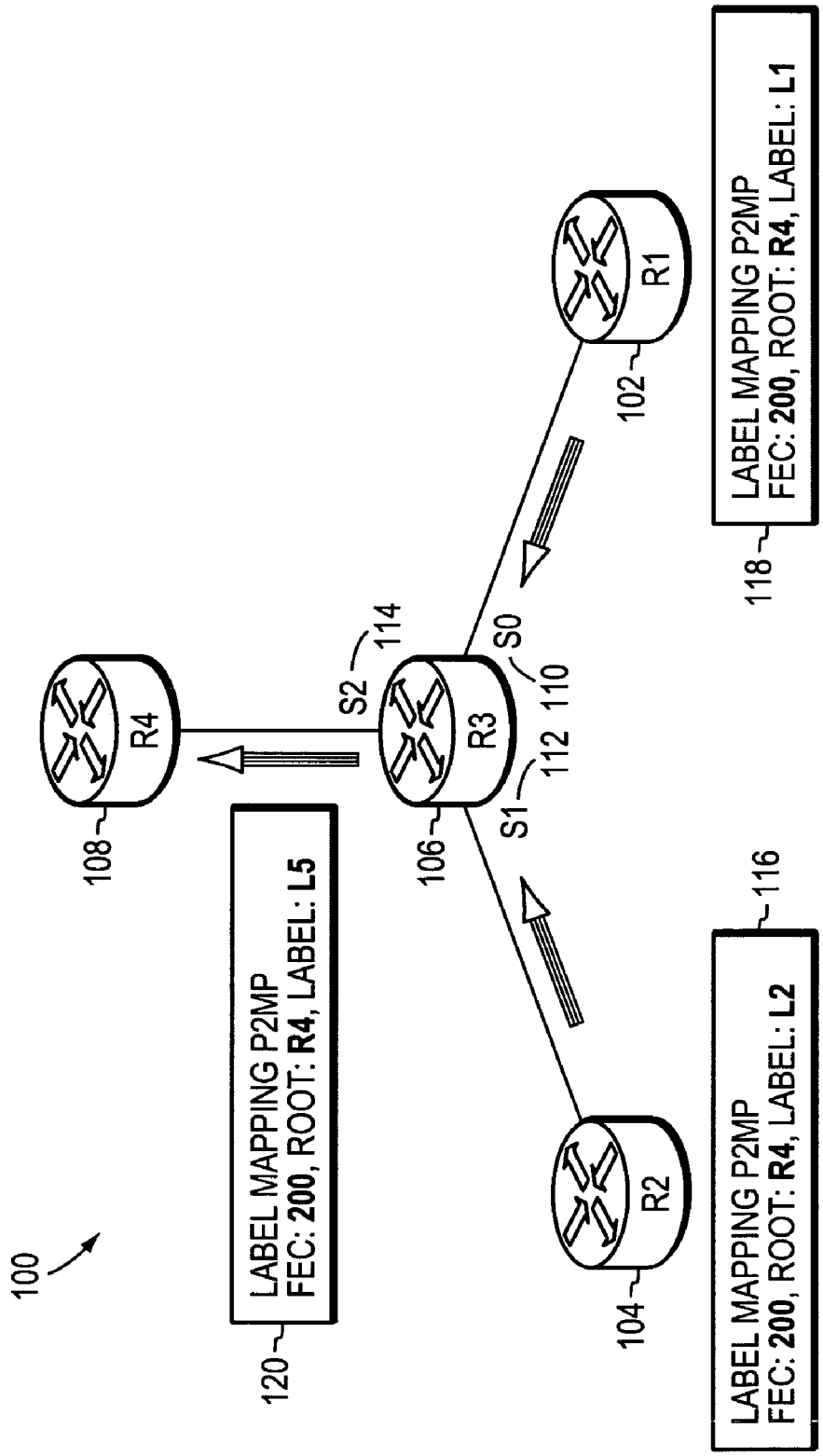
FIG. 1 is a schematic diagram illustrating a P2MP network.
Figure 2:
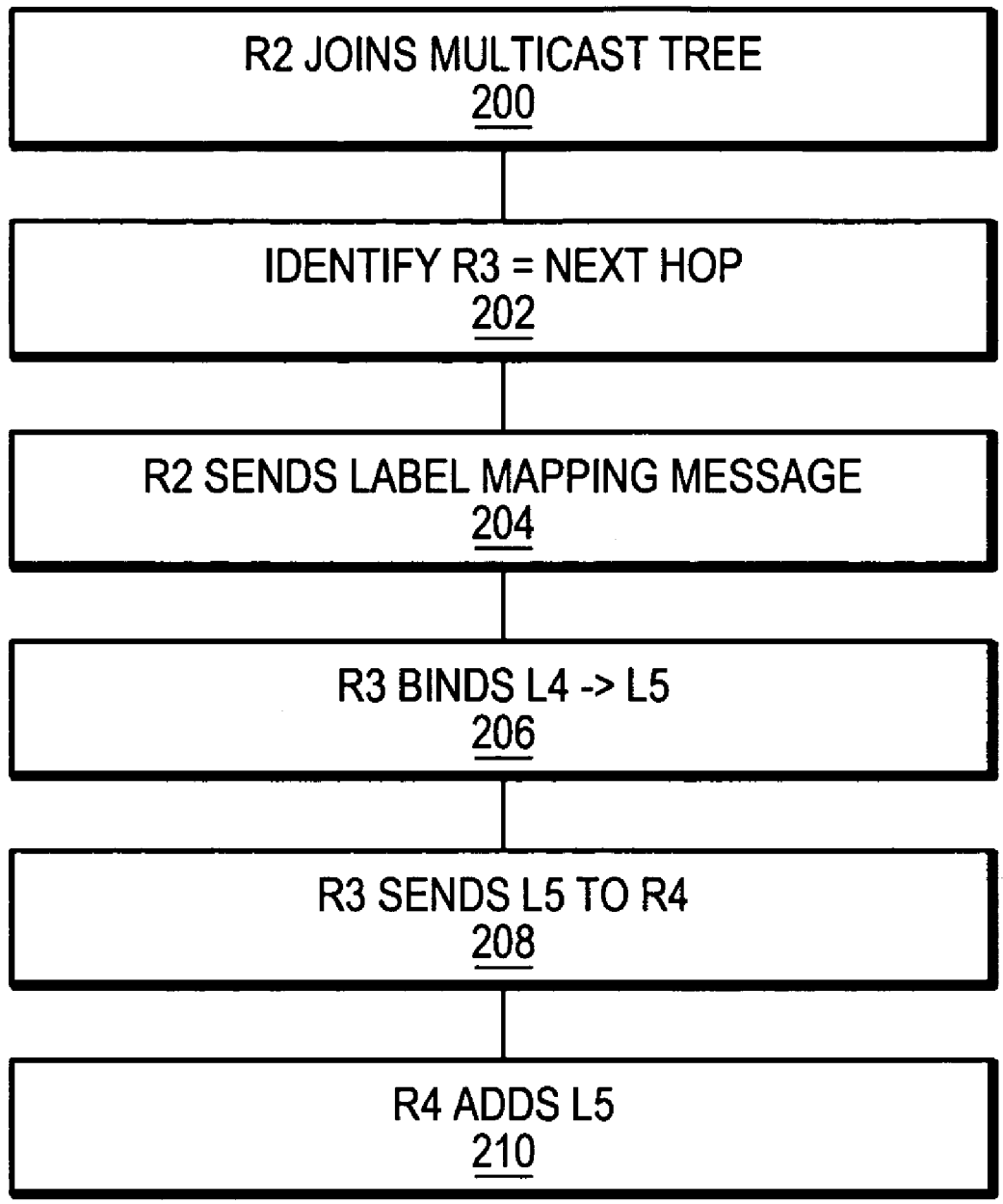
FIG. 2 is a flow diagram illustrating the steps involved addition of a leaf to a P2MP network.
Figure 3:
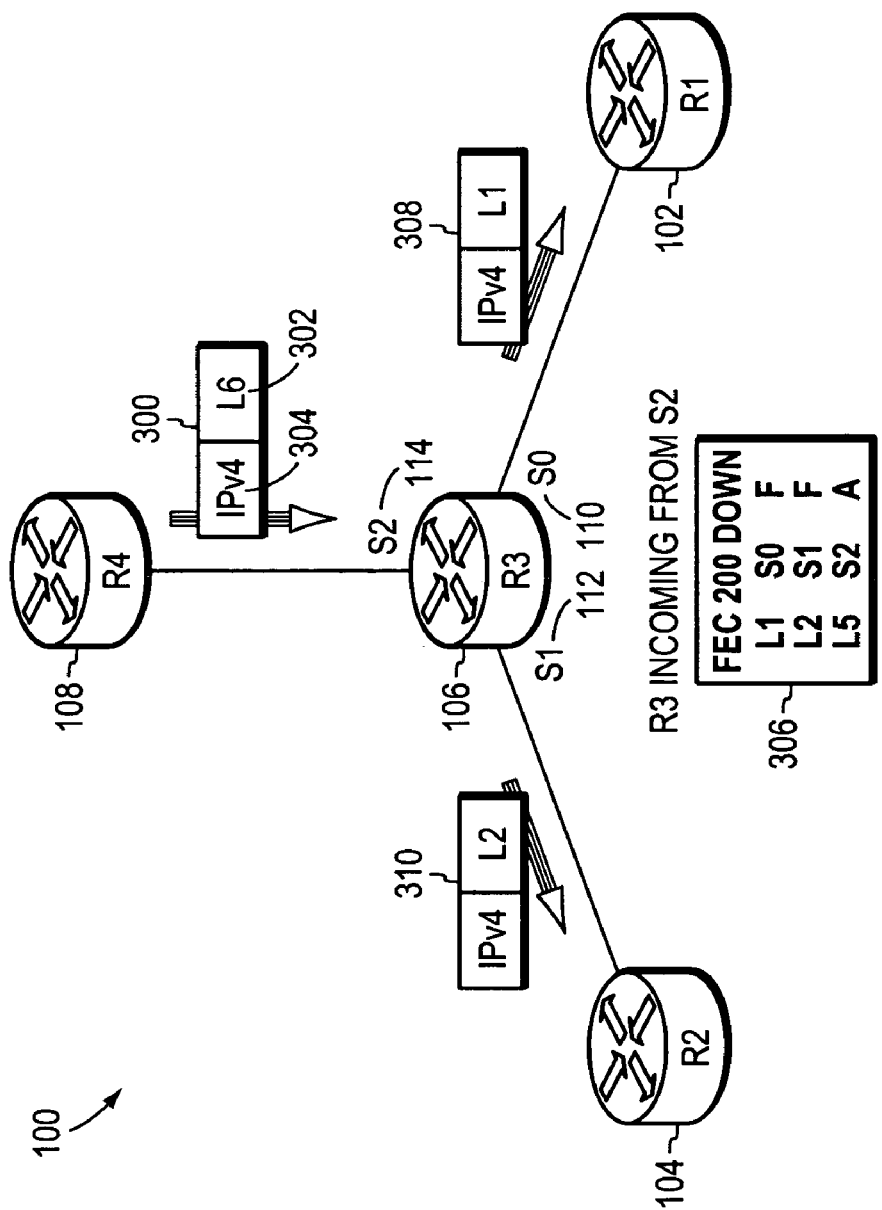
FIG. 3 is a network diagram corresponding to FIG. 1 showing the forwarding of multicast traffic on a P2MP network.
Figure 6:
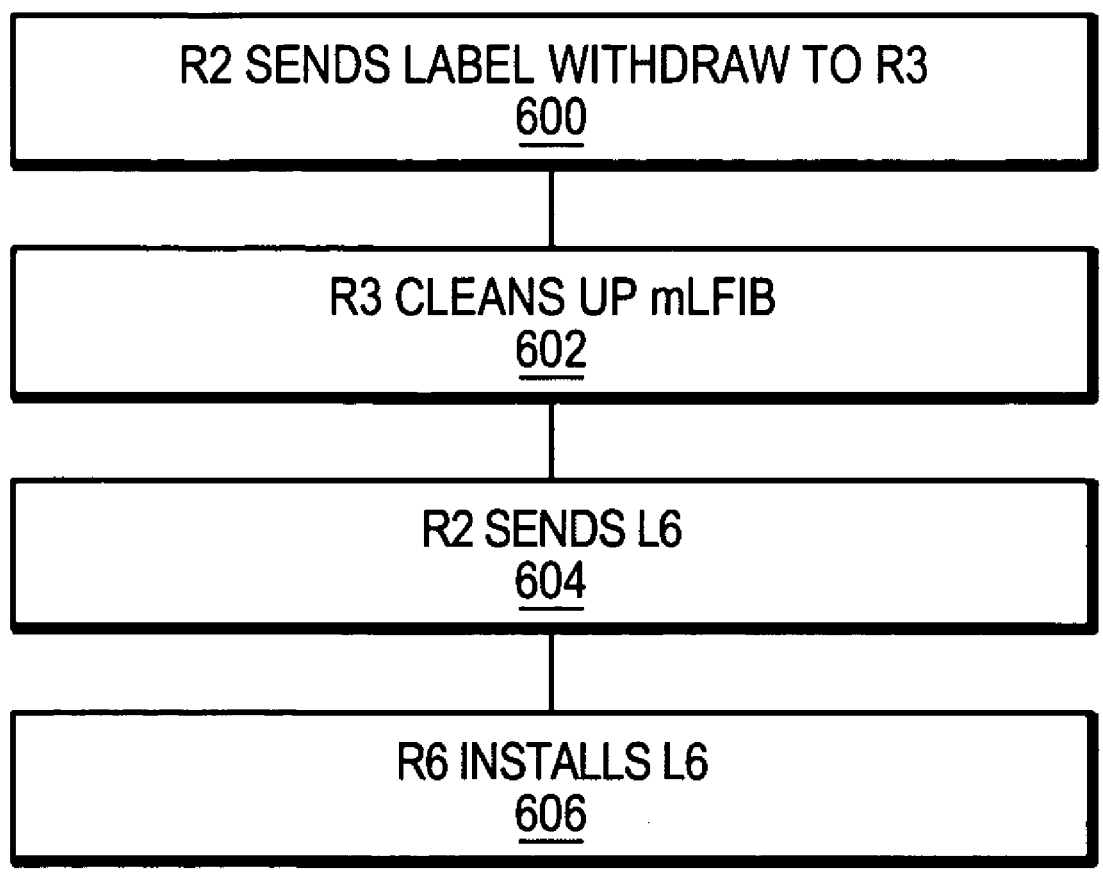
FIG. 6 is a flow diagram illustrating the steps involved in a label withdraw session when a nexthop changes in a P2MP network.
Figure 7:
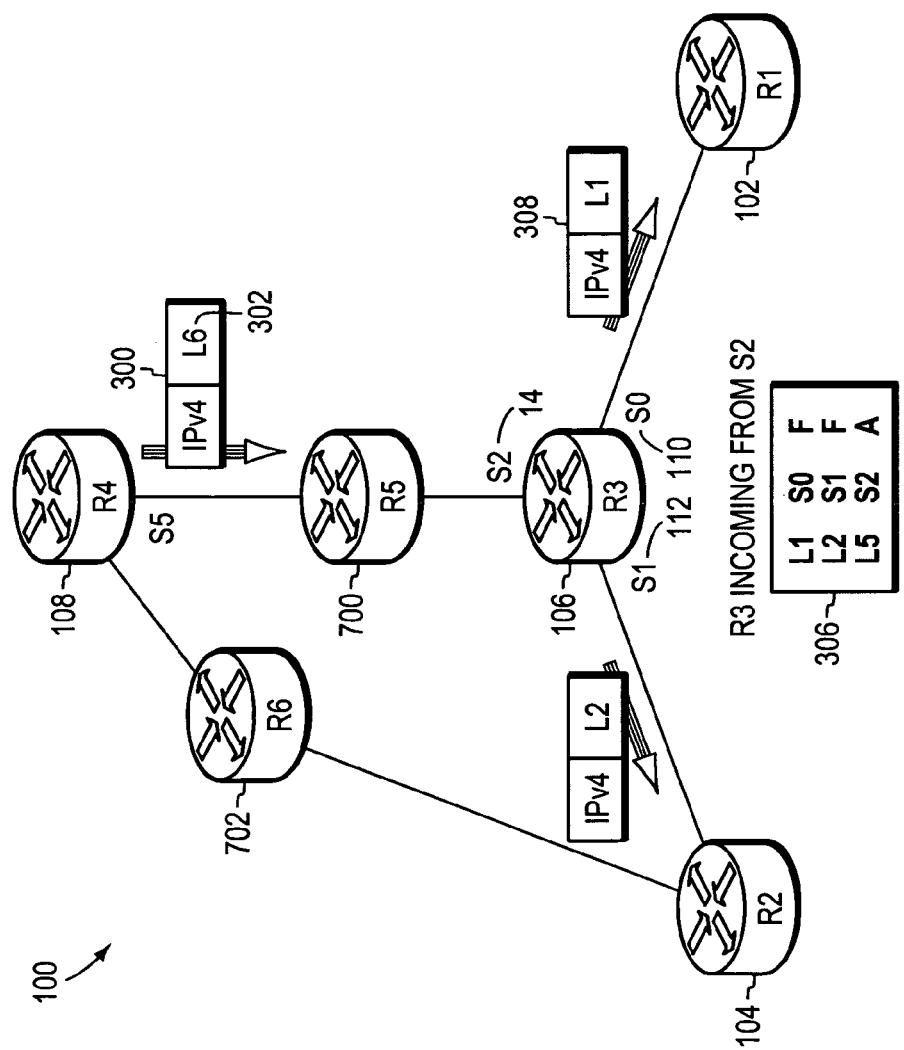
FIG. 7 is a schematic diagram of a network as shown in FIG. 3 with additional nodes to illustrate a nexthop change.
Figure 8:
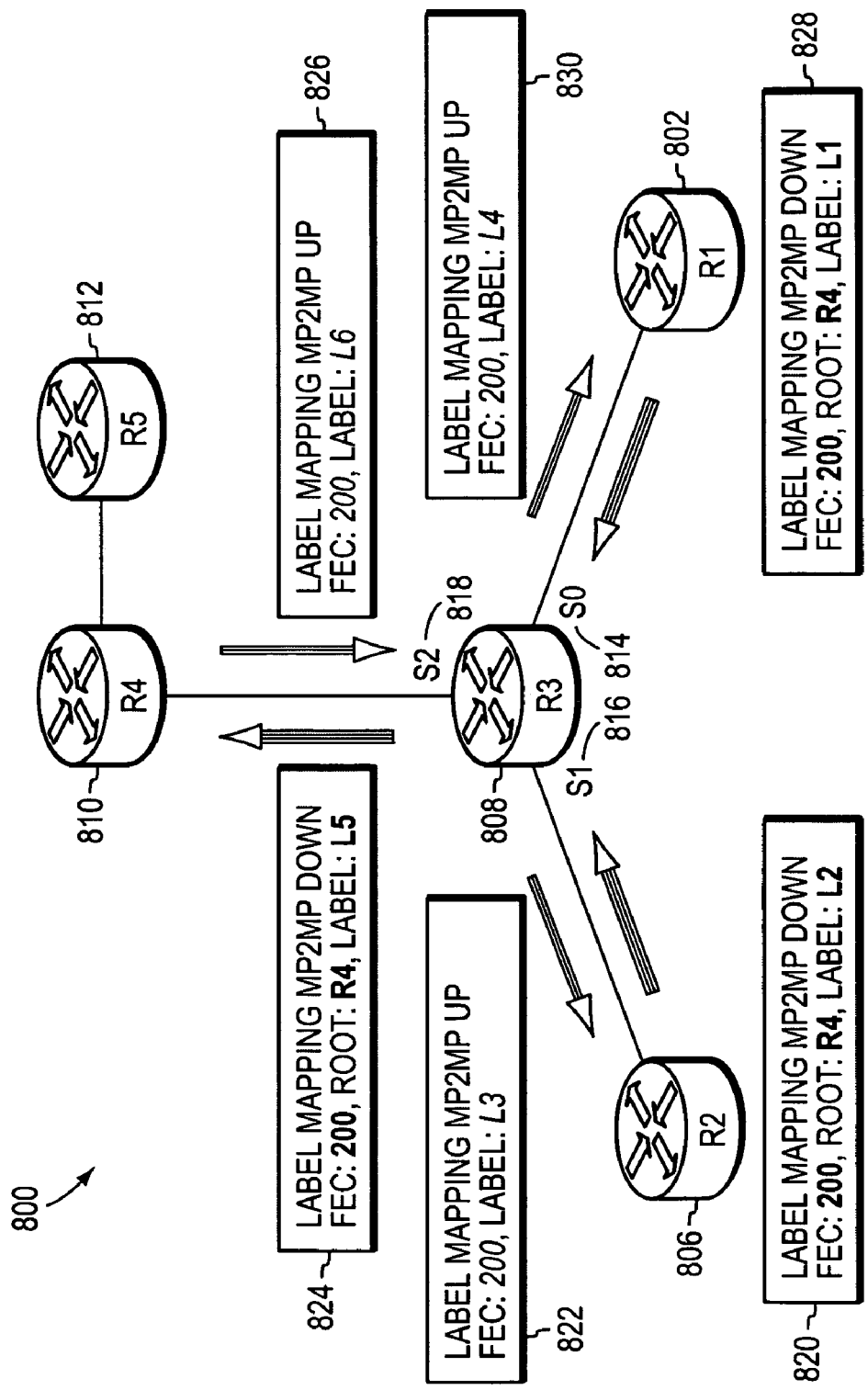
FIG. 8 is a schematic diagram illustrating an MP2MP network.
Figure 9:
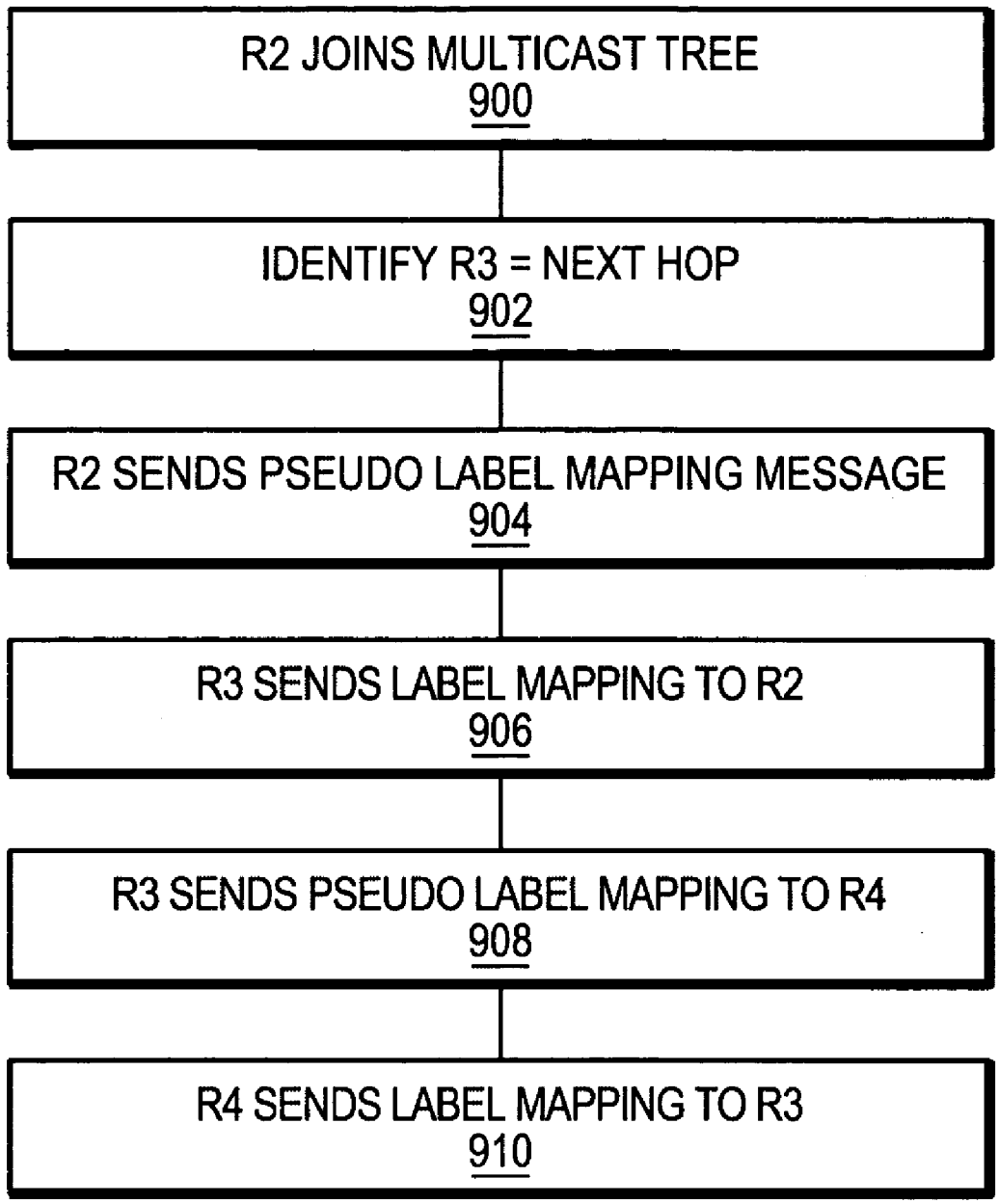
FIG. 9 is a flow diagram illustrating the steps involved in addition of a leaf to an MP2MP network.
Figure 10:
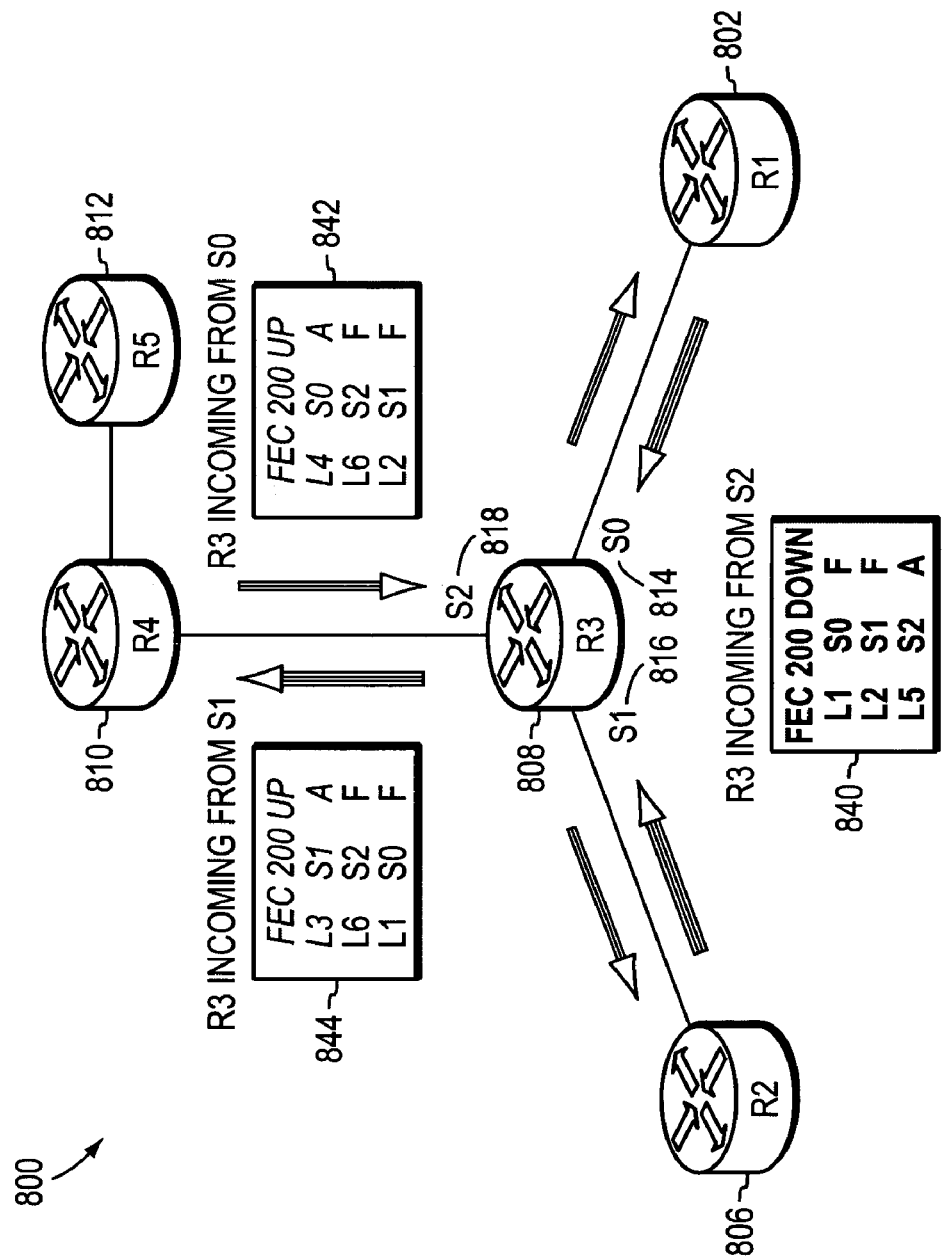
FIG. 10 is a schematic diagram of an MP2MP network corresponding to that of FIG. 8 showing forwarding of up and down traffic.
Figure 11:
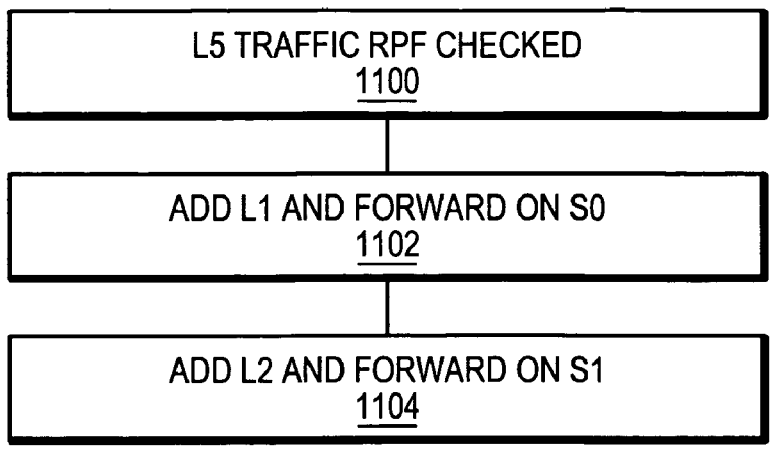
FIG. 11 is a flow diagram showing steps involved in forwarding down traffic in an MP2MP network.
Figure 12:
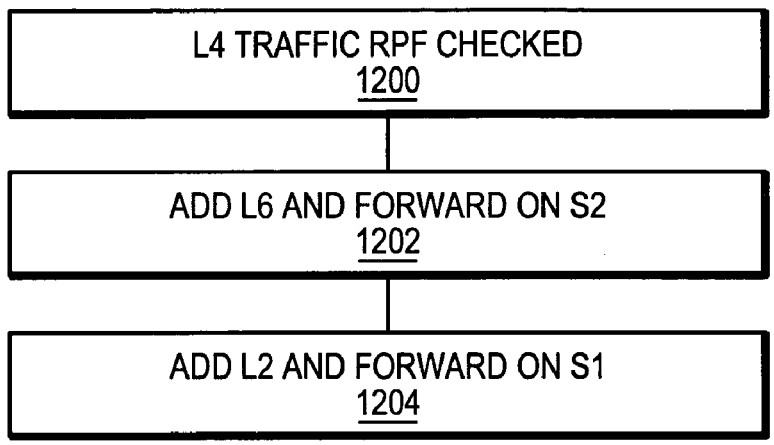
FIG. 12 is a flow diagram showing steps involved in forwarding up traffic from a first leaf in an MP2MP network.
Figure 13:
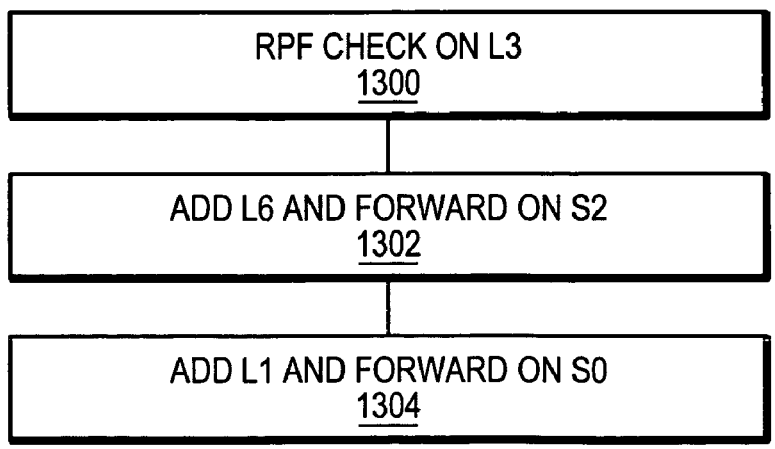
FIG. 13 is a flow diagram showing steps involved in forwarding up traffic from a further leaf in an MP2MP network.
Figure 14:
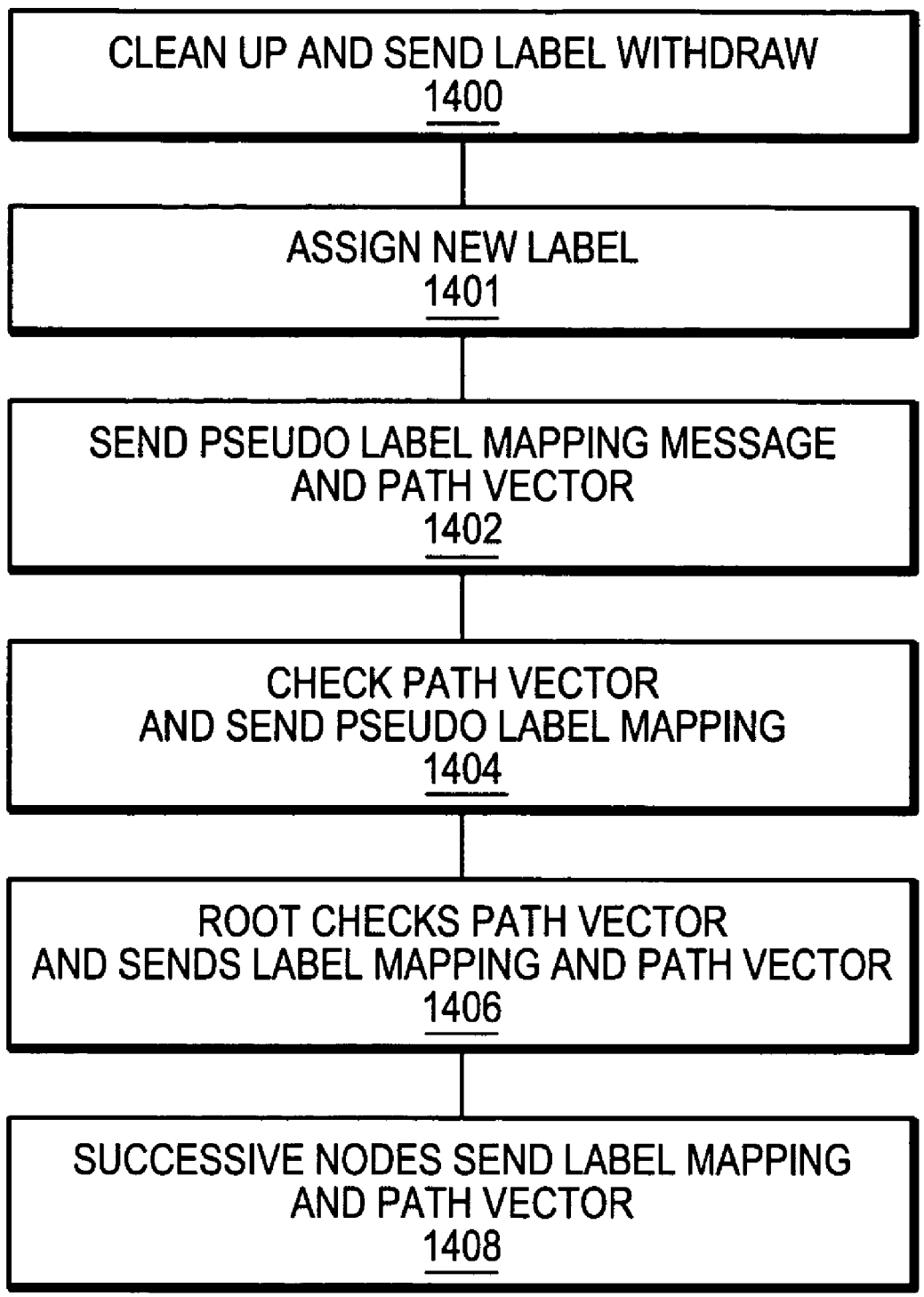
FIG. 14 is a flow diagram showing at a high level steps involved in avoiding loops in an LDP multicast network.

FIG. 14 is a flow diagram showing, at a high level, the steps involved according to the method described herein. At step 1400, when a change takes place, the corresponding local data plane rewrites are cleaned up immediately and, if the nexthop is changed, label withdrawal and release for the local and remote labels are also sent immediately. Importantly, the multicast LDP label hold time is set to zero such that the labels are not held open in case the FEC is reintroduced.

At step 1401, all local labels associated with a nexthop change are replaced with new labels.

At step 1402 a node such as a distributing node sends a pseudo label request (label mapping) message to its nexthop towards the root node, in conjunction with its path vector, that is, information representing the path to the root. The distributing node may be a node adjacent to a nexthop change and may comprise multiple nodes.

At step 1404, the nexthop node towards the root node carries out a loop or convergence detection step and checks the path vector against its own path vector and, if it is not in the path vector—i.e., there is loop —it sends a pseudo label request (label mapping) message to its nexthop towards the root node together with its path vector. This is repeated at each node until the root node receives a pseudo label request (label mapping) message and path vector which are checked against its own path vector. If they match then the root node sends its label mapping message with an up traffic label and its path vector back down the path. The receiving node once again checks the received path vector against its own path vector and, if there is a match, sends a further label mapping message and its path vector to the next node in the path and so forth until the distributing node receives its label mapping. To ensure convergence in both directions (i.e., for down traffic and up traffic) in one optimization, each downstream node in the up traffic sense only sends its up traffic label mapping to an upstream node once it has received such a mapping from its upstream nexthop accordingly. As a result the up traffic tables are updated in order from the root. However it is also possible for each downstream node in the up traffic sense to send a label mapping response to the pseudo label request (label mapping) from the upstream node without waiting to hear from its own downstream node in which case the path vector match step still ensures that all nodes are converged.

As a result, transient micro loops are prevented in the multicast network as an ordered convergence is achieved in one or both directions. In particular because each node towards the root checks its path vector and will only forward its pseudo label request (label mapping) for down traffic if its received path vector corresponds then it is ensured that the nodes are converged and in the correct order for down traffic. If it only sends its label mapping for up traffic if its path vector corresponds with that received from its nexthop nearer to the root, it is ensured that the preceding nodes towards the root are converged and in the correct order for up traffic. The process is accelerated because of the clean up, rewrite and reduction of hold down time at a zero step at 1400 and looping between old and new trees is avoided according to the label allocation procedure described.

3.0 Method of Distributing Labels in a Label Distribution Protocol Multicast Network The mechanism which can give rise to looping can be understood further with reference to FIGS. 15*a* and 15*b* which are diagrams showing potential inconsistencies between data plane (the mFLIB held on each line card (LC) of a router) and control plane (the FIB, LFIB and mLFIB from which the data plane is duplicated). Referring to FIG. 15*a*, node R1 is shown generally at 1500 and includes a control plane 1502 and a data plane 1504. It will be seen that where the control plane 1502 and data plane 1504 are not in synchronization, there will be stale forwarding entries at R1 which can give rise to looping even if, for example, the data plane 1508 and a node R2 1506 is synchronized with the control plane 1502 with node R1. Referring to FIG. 15*b*, in an alternative possible configuration is shown in which the control plane 1502 and data plane 1504 of node R1 are synchronized with one another, but the control plane 1502 of node R1 is not synchronized with the data plane 1508 of node R2.

Figure 16:
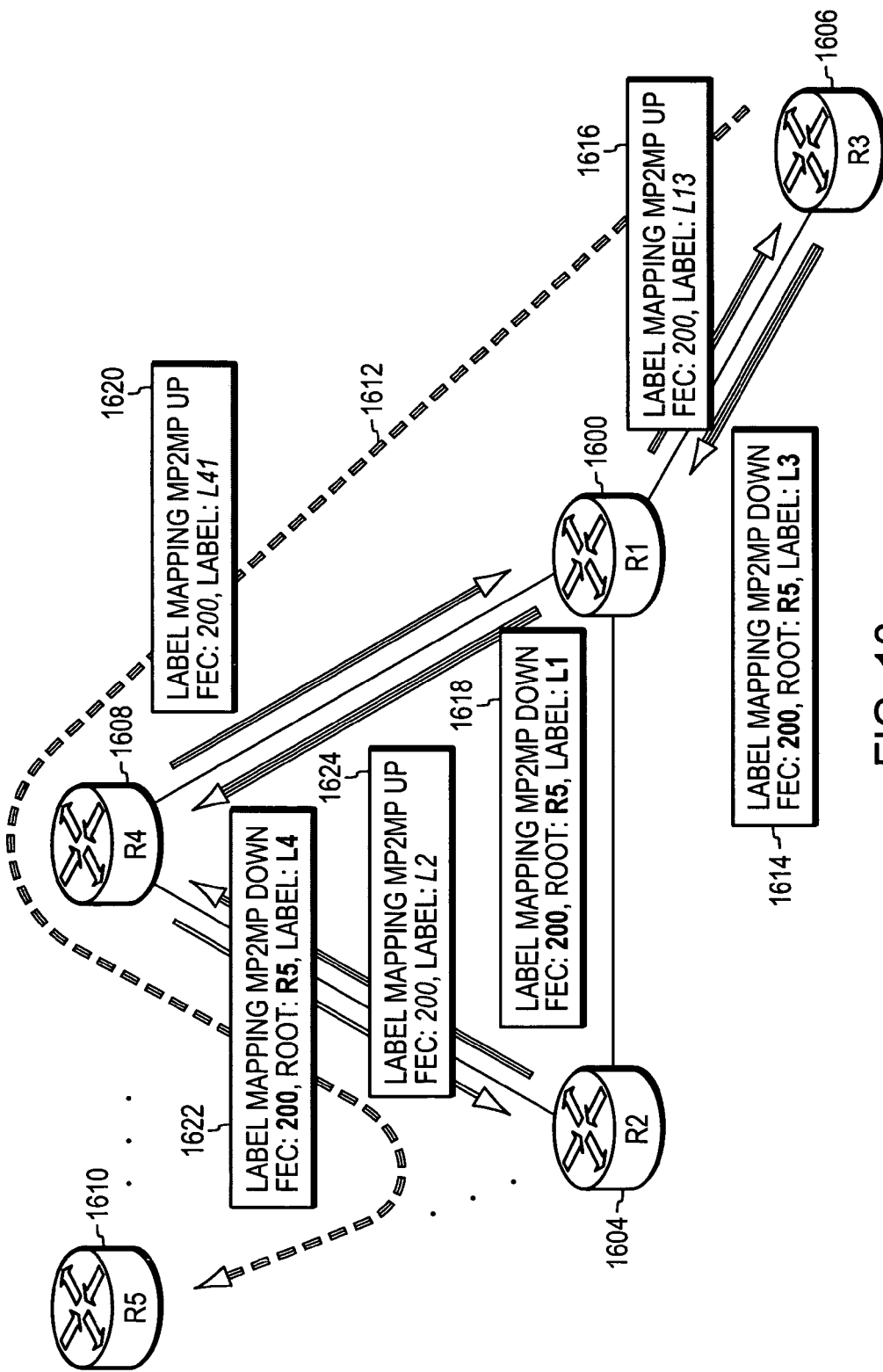
FIG. 16 is a schematic diagram showing an MP2MP network in steady state.

The problem can be understood in the specific case of up traffic in MP2MP with reference to FIG. 16 in which a further alternative network is shown such that the nodes although commonly labeled, are numbered differently. In particular a network includes nodes R1 to R5, reference numerals 1600, 1602, 1604, 1606, 1608, 1610 respectively. Nodes R3, R2 and R4 are connected to node R1. Nodes R2 and R4 are further connected, and both provide paths to root node R5, with node R2 as nexthop to node R5. Node R3's path vector to node R5 is therefore R3-R1-R4-R2- . . . R5 as is shown generally by arrow 1612. Node R3 sends a pseudo label request (label mapping) 1614 with FEC 200, roots R5, label L3 for down traffic to node R1 which returns a label mapping 1616 for up traffic with FEC 200 and label L13. Node R1 sends a pseudo label request (label mapping) 1618 for down traffic to node R4 with FEC 200, root R5, label L1 and node R4 returns a label mapping 1620 with FEC 200 and labels L41. Node R4 sends a pseudo label request (label mapping) 1622 for down traffic to node R2 with FEC 200, root R5 and label L4 and node R2 returns a label mapping 1624 for up traffic with FEC 200 and label L2. Node R2 carries out further label mappings of the same type with its nexthop to node R5 and so forth.

Figure 17:
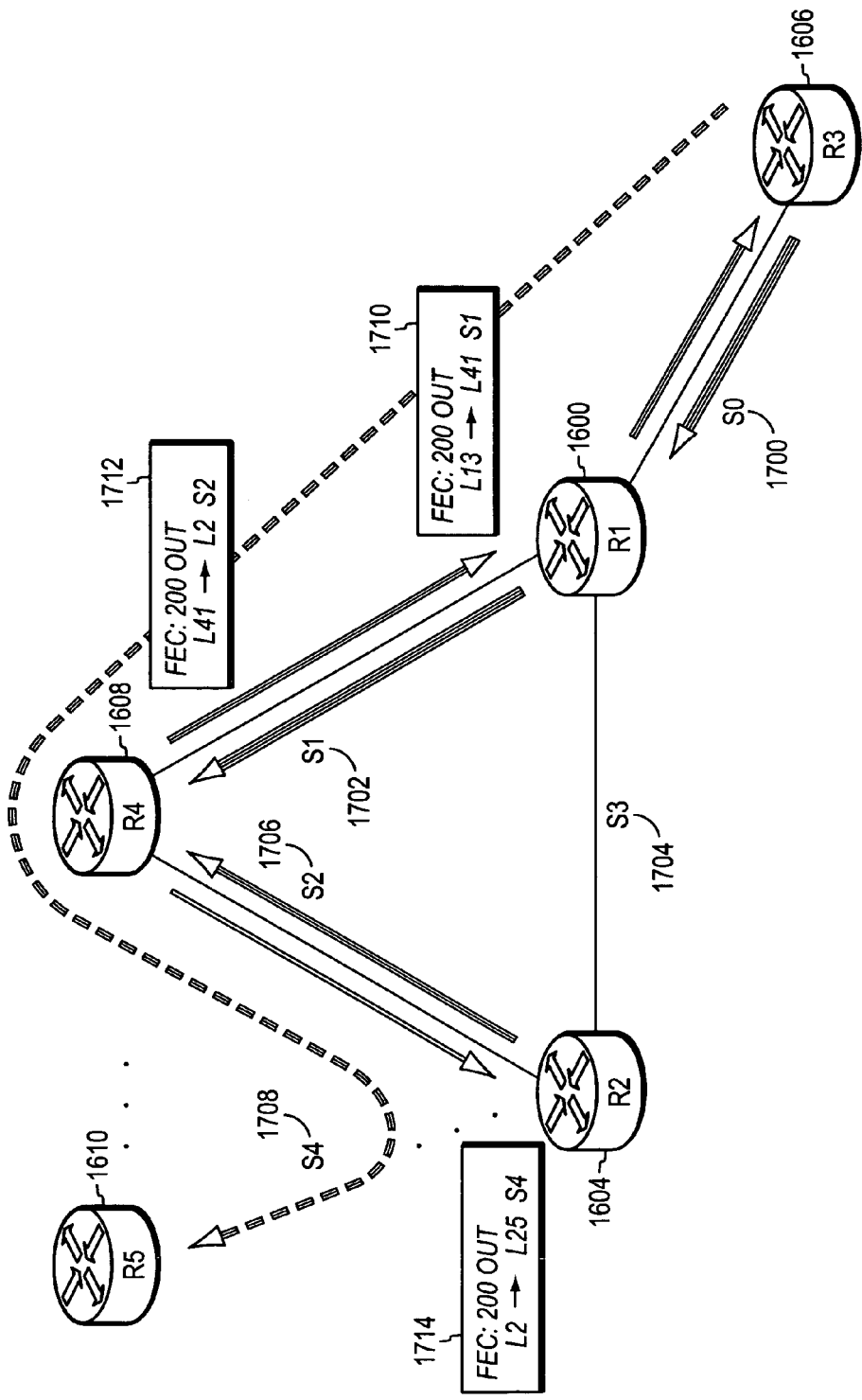
FIG. 17 is a network diagram corresponding to that of FIG. 16 showing forwarding of up traffic.

Referring to FIG. 17 which is a network diagram corresponding to FIG. 16 showing forwarding of up traffic, for ease of reference interfaces are commonly labeled for adjacent nodes. Nodes R1 and R3 communicate over respective interfaces S0, reference numeral 1700, nodes R1 and R4 communicate via interfaces S1, 1702, nodes R1 and R2 communicate over interfaces S3, 1704, nodes R2 and R4 communicate over interfaces S2, 1706 and nodes R2 and R5 communicate over interfaces S4, 1708. Accordingly when node R3 sends up traffic with label L13 to node R1 then node R1's forwarding table swaps label L41 for label L1 3 and sends traffic on interface S1 to node R4. According to node R4's forwarding table 1712, label 41 is swapped for label S2 and the packet is sent on interface S2 to node R2. According to node R2's forwarding table 1714, label L2 is swapped for label L25 and the packet is forwarded on interface S4.

Figure 18:
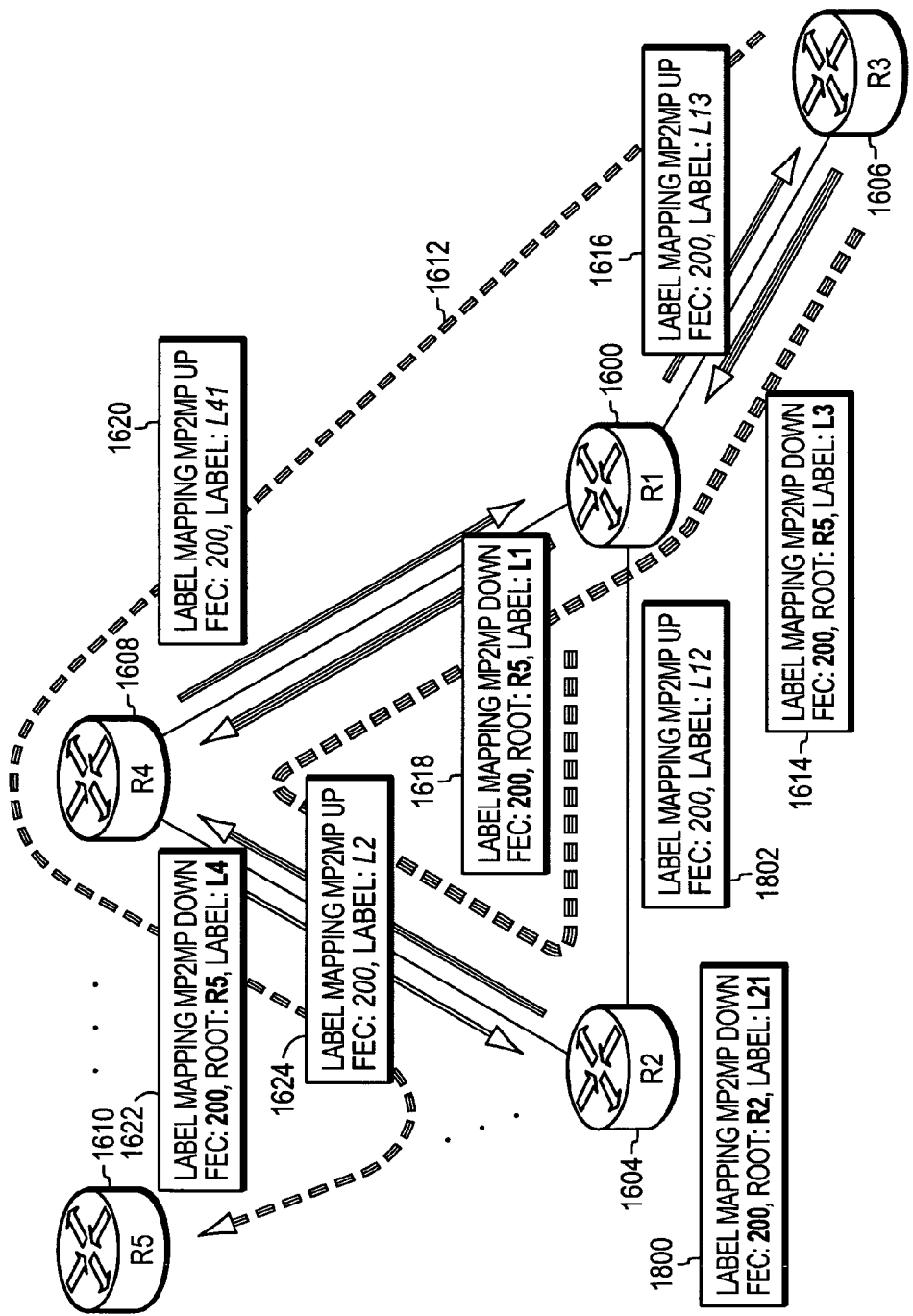
FIG. 18 is a network diagram corresponding to the network of FIG. 16 after a route change.

An instance in which looping can occur in relation to up traffic can be further understood with reference to FIG. 18 which is a network diagram corresponding to that of FIG. 16 but in which node R2 no longer has a path to node R5 for example because of component failure on the path as a result of which node R4 is nexthop to root node R5. In particular problems can arise, for example, when node R2 has converged on the new topology but node R4 has not. In that case the up and down label mapping between nodes R1 and R3 and between nodes R1 and R4 are unchanged. However node R2 has sent a pseudo label request (label mapping) 1800 to node R1 indicating FEC 200, root R5, label 21 for down traffic and node R1 has returned an up traffic label mapping with FEC 200 and label 12 at 1802. As a result node R3*s* path vector to node R5 is R3-R1-R4 . . . R5. However because node R4 has not converged, for example, because R2 has not yet sent a label withdrawal to R4 or because R4 has not yet processed it, upon receipt of a packet with label L41 on interface S1, this will be forwarded to node R2 on interface S2 with label L2. As node R2 has converged on the network and has as its nexthop R1 (for example because the link between node R2 and node R4 is at too high a cost) then it swaps label L2 with label L12 and forward to node R1 which returns a packet to R4 setting up a loop shown generally at 1804 and following the path R3-R1-R4-R2-R1-R4-R2 and so forth.

Figure 19:
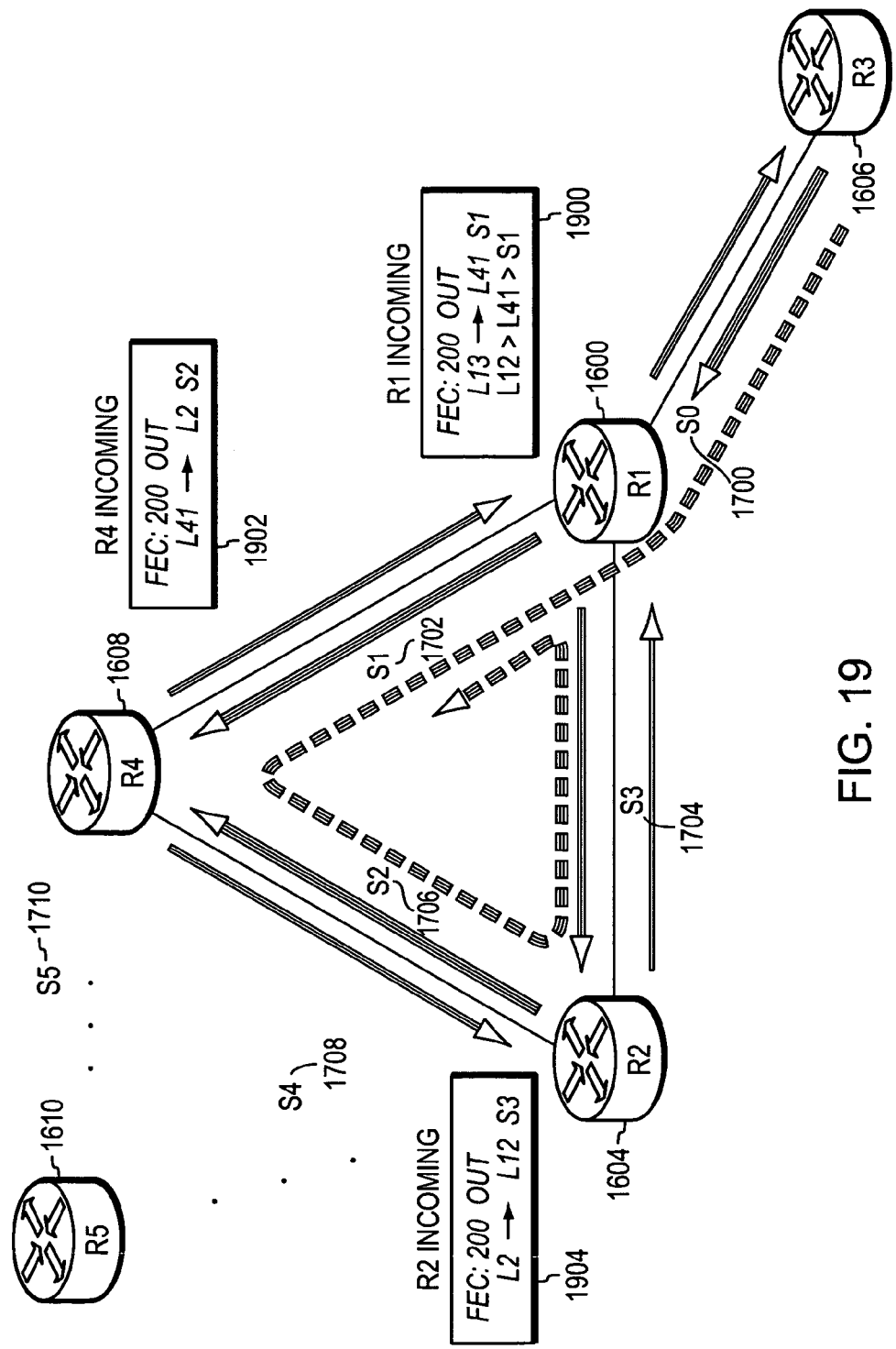
FIG. 19 is a network diagram corresponding to the network of FIG. 18 showing a forwarding loop for up traffic.

This can be understood further with reference to FIG. 19 which is a network diagram corresponding to FIG. 18 and showing the respective forwarding table portions for nodes R1, R4 and R2. In particular for traffic incoming on interface S0 node R1's forwarding table 1900 replaces label L13 with label L14 and forwards the packet on interface S1. R4's forwarding table 1902 replaces L41 with label L2 and forwards on S2. Node R2's forwarding table 1904 replaces label L2 with L12 and forwards on interface S3, R1's forwarding table replaces L12 with L41 and forwards to node R4 on S1 and so forth. It will be seen, therefore, that looping arises in particular as a result of failure or delay in converging between nodes.

It can be seen that the problem is exacerbated as convergence is required for both up traffic and down traffic as a node issuing a pseudo label request may not converge at the same time as the node receiving the pseudo label request. Because the node received in the pseudo label request responds to the request immediately by sending the corresponding label mapping message whether or not further nodes closer to the route are converged, then inconsistencies may arise between mLFIBs on local and remote devices giving rise to potential micro loops. However there is currently no mechanism to indicate the convergence of nodes closer to the root and the following description relates to prevention of such an up event transient micro loop by distributing and installing label rewrites only after confirming that nodes further from the root are converged providing strict ordered convergence and mFIB/mLFIB installation.

Figure 20:
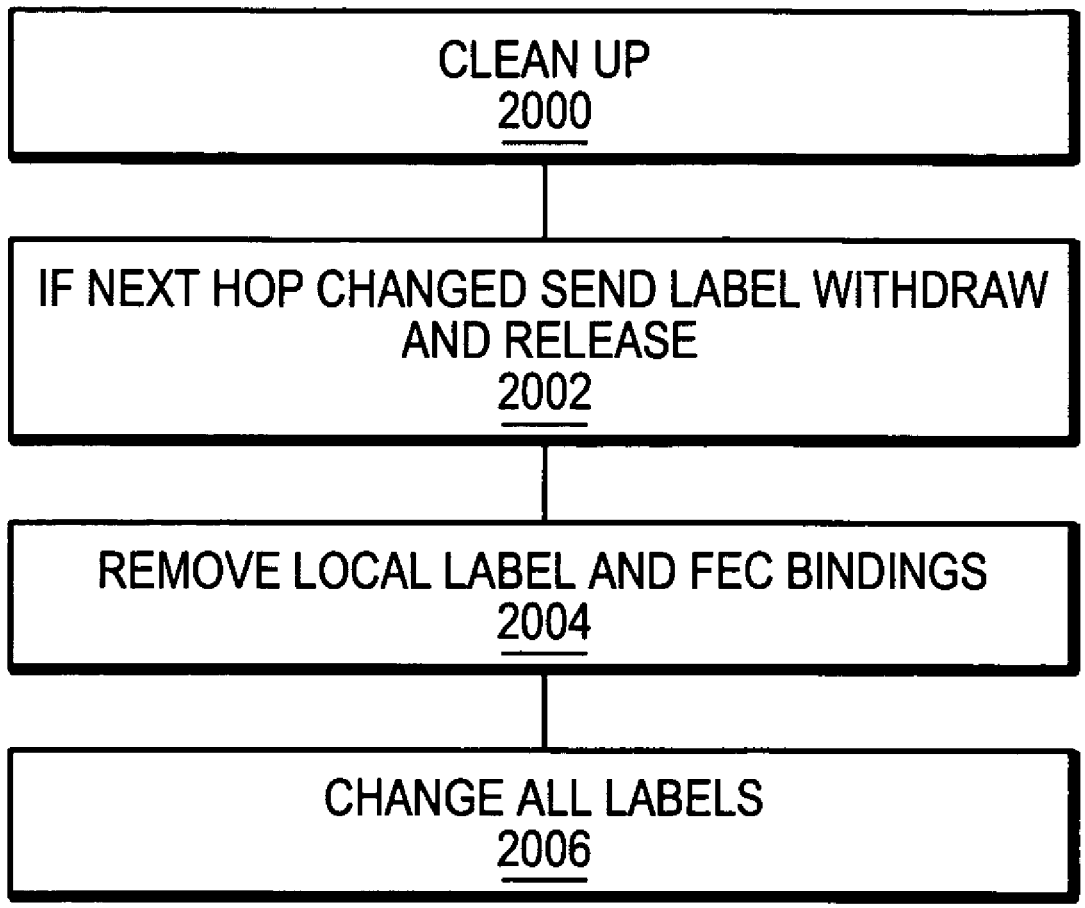
FIG. 20 is a flow diagram showing in more detail steps involved in preventing looping.

Firstly, therefore, referring to FIG. 20 which is a flow diagram illustrating steps carried out in a clean up procedure of the data plane at step 2000 the local data plane rewrites are cleaned up and, at step 2002, if the nexthop is changed label withdraw and release for the local and remote labels are sent immediately. It will be noted that in this case a multicast LDP label hold time period is set at zero. At step 2004 local label, FEC mappings/binding and rewrites are removed. All of these steps are carried out substantially immediately such that the time during which micro looping can occur is minimized because the data plane converges as quickly as possible. At step 2006, if an ingress interface of a P2MP tree changed as a node then all as a node then all associated MP2MP local labels are changed at that hop to make the old and new multicast LPS's disjoint. As a result, even if a remote node is using an old label it will not create a loop and in particular traffic will not be forwarded back and forth between the old and the new tree which could be the case if labels were shared. It will be noted that the new label need only be allocated if the nexthop is changed which is preferable as label space is not unnecessarily reduced.

Furthermore, ordered mFIB/mLFIB installation is achieved by using a strict ordered convergence which may be for down traffic or in both directions i.e., for up and down traffic.

Figure 21A:
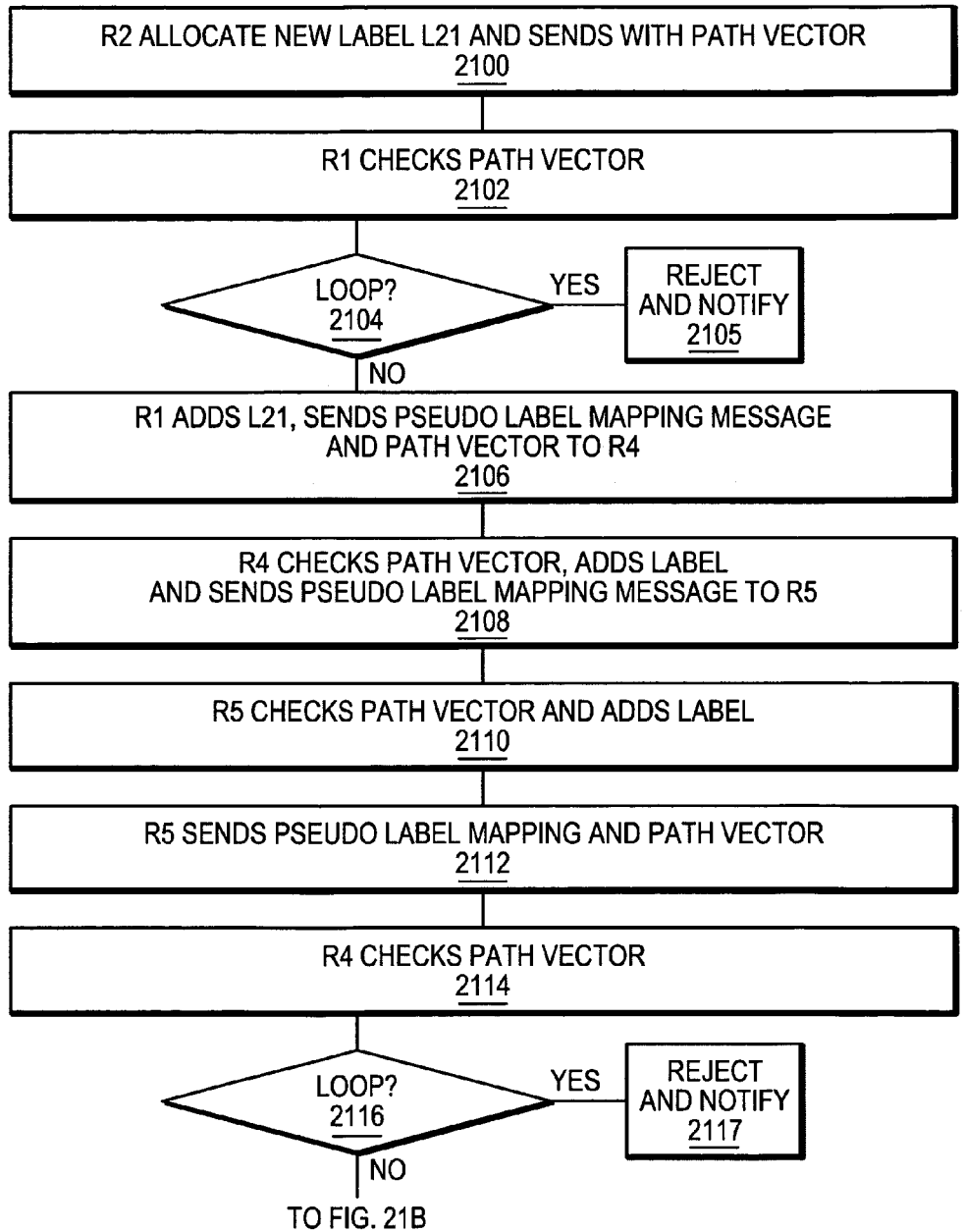
FIG. 21A is a flow diagram showing in more detail steps involved in preventing loops according to another aspect.
Figure 21B:
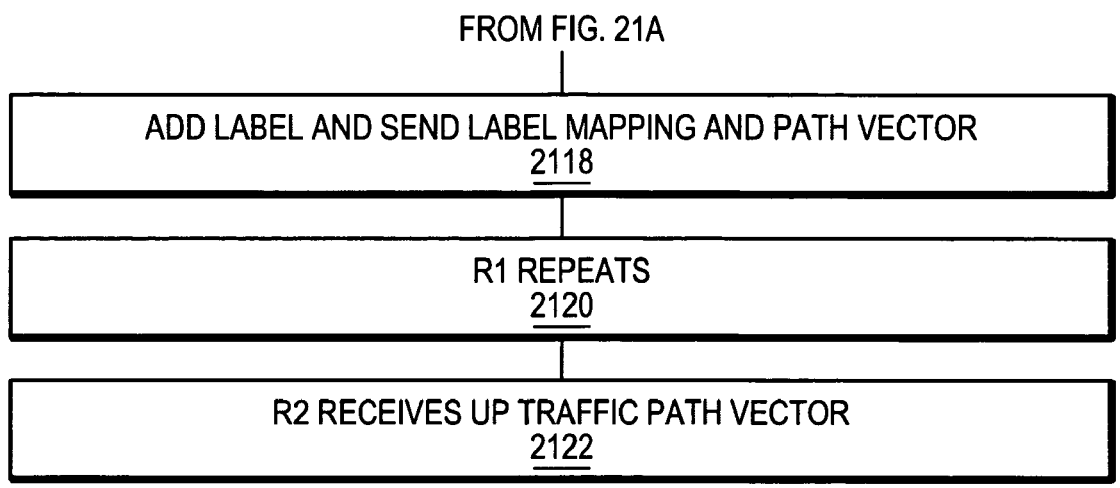
FIG. 21B is a continuation of the flow diagram of FIG. 21A.

The manner in which this is achieved can be understood further with reference to FIGS. 21 A and 21 B which shows a flow diagram illustrating the steps in ensuring ordered convergence in relation to the network change set out above with reference to FIGS. 18 and 19. In particular node R2 acting as distributing node is considered. At step 2100 R2 allocates its new label R21 sends a pseudo label mapping to its new nexthop R1 with the label L21 and its new unicast path vector R2-R1-R4-R5. It will be noted that there may be many nexthop changes associated with the same reroute in which case each node having nexthop changes will initiate the pseudo label request towards the route. However for the same FEC these label request messages are merged and a single message is sent to the root. When the response is received from the root (as discussed in more detail below), then each requesting node receives the response separately.

At step 2102 node R1 receives the pseudo label request (label mapping) and checks the received path vector against its own path vector to see if they match and/or checks whether it appears in the received path vector signifying a loop. At step 2104, if the path vectors are the same then this indicates that the downstream node to R1 (in the sense of up traffic-i.e., node R2) is converged. However upstream nodes may not be converged. Accordingly, optionally without sending a label mapping response to node R2 at this stage, node R1 sends its own pseudo label request (label mapping) message and path vector to its next hop node R4 at step 2106. If non-convergence/a loop are detected, then at step 2105 node R1 will reject the pseudo label request (label mapping) message and notify node R2 accordingly. Then, for example, node R2 may wait a pre-determined period (for example slightly exceeding the maximum convergence time for the network) and resend its label mapping message and path vector which should then be converged.

At step 2108 node R4 checks its path vector against the received path vector and if a match is established forwards its label request on to the nexthop to node R5, again optionally without returning a label mapping for up traffic to node R1.

In each case, node R1 and node R4 will, upon path vector match, update their down traffic forwarding tables to include the label learnt from their down stream neighbor in the down traffic sense (node R2 and R1 respectively). In other words node R1 will install node R2's label L12, node R4 will install node R1s label L41 and so forth. As a result it will be seen that, for down traffic, ordered convergence is achieved in the up stream direction from the leaf node to the root. Hence, down traffic from the root will not be subjected to loops once the root has been updated as there is no possibility of down traffic traveling in a down stream direction from a converged node to a non-converged node.

At step 2110, root R5 receives a pseudo label request (label mapping) message, checks the path vector against its own path vector for loop defects and, if there is a match, at step 2112, sends a label mapping response and its path vector back up stream, in the up traffic sense. At step 2114, the nexthop node for example node R4, checks the path vector against its path vector and, if they are matched at step 2116, then at step 2118 if it has optionally withheld doing so node R4 sends its label mapping for up traffic and path vector to node R1 which carries out the same steps at 2120. It will be noted that if the path vector does not match at step 2116 then, at step 2117, node R4 sends a reject and notify message to its downstream node in the up traffic sense which can then delay resending its label mapping and path vector for a suitable period as discussed above with reference to step 2105.

In the case where the up traffic label mapping was previously withheld at each node in response to a pseudo label request (label mapping) message then, at step 2122 node R2 receives the up traffic label mapping response from node R1. In this case as each node receives its up traffic label mapping from the preceding node starting at the root node, and checks the path vector is matched, then it is assured that the down stream nodes, in the up traffic sense, are converged and it can install the received label. As a result ordered label installation is carried out in the up stream direction in the up traffic sense in much the same way that it was in the opposite direction for down traffic such that up traffic from sender node R2 cannot loop once it has updated its up traffic forwarding table accordingly.

In the alternative optional approach whereby each node sends its up traffic label mapping once the path vector accompanying a pseudo label request (label mapping) message has been verified, the path vector matching step in any case ensures that all of the nodes are converged. This alternative approach has the advantage that there is potentially less delay in updating the up traffic forwarding table at each node as it does not have to wait for a "cascade" of up traffic label mappings down from the root.

Figure 22:
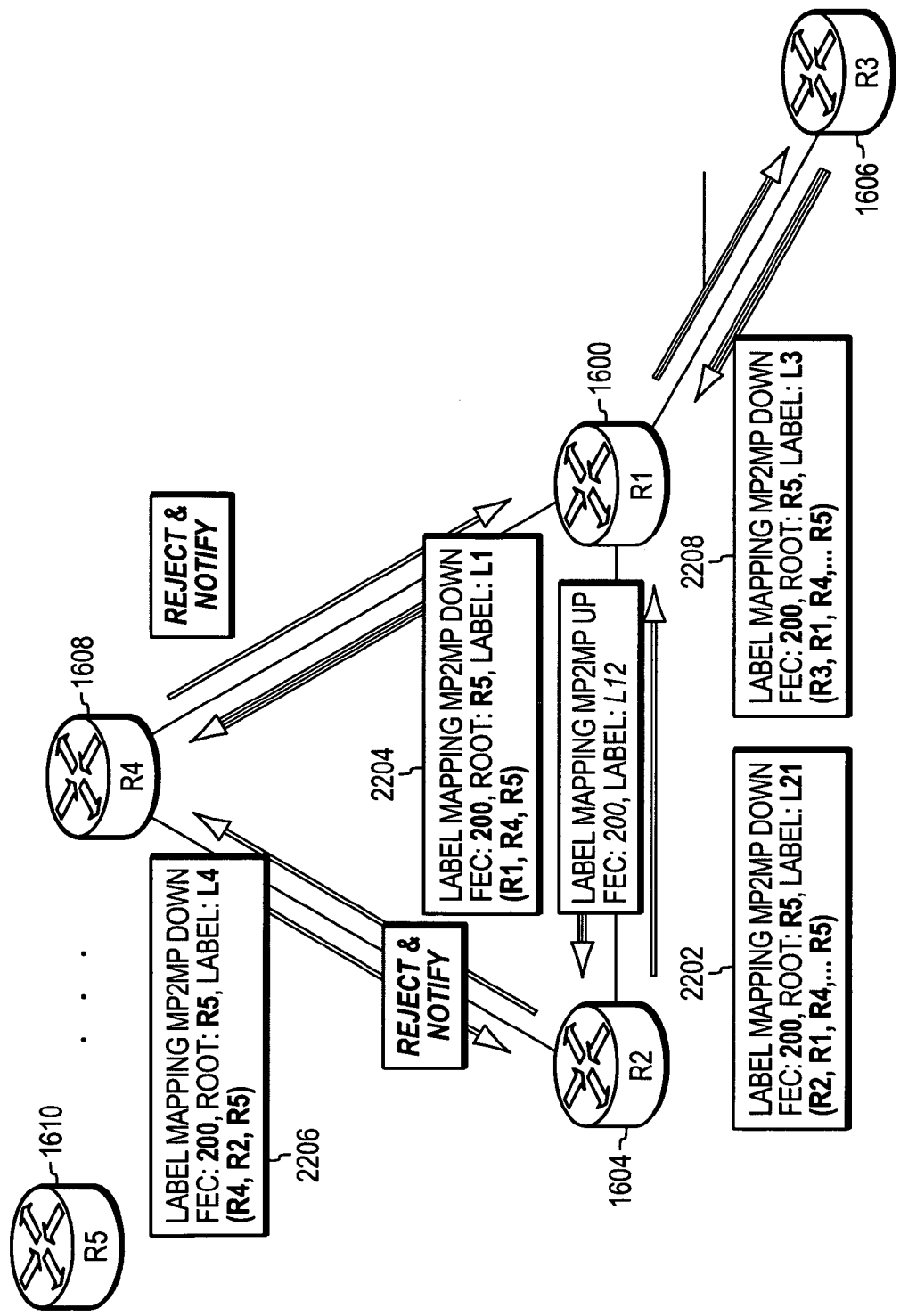
FIG. 22 is a network diagram corresponding to FIG. 18 showing steps involved in loop prevention.

This approach can be further understood with reference to FIG. 22 which is a network diagram corresponding to FIG. 18. Node R2 sends a pseudo label request 2202 with its down traffic label mapping FEC 200, root R5, label L21 and its converged path vector R2-R1-R4- . . . R5. Node R1, which is also converged, matches this path vector and forwards its pseudo label request (label mapping) 2204 to node R4. However node R4's path vector is R4-R2-R5- and, as node R4 appears, implying a loop, it sends a reject and notify message to R1.

Similarly if node R4 has received a label release it sends a pseudo label request (label mapping) 2206 with FEC 200, root R5, label R4 and path vector R4-R2-R5 which is rejected and notified by node R2.

It can further be seen that other nodes may also be triggered to send pseudo label requests according to the route table. For example if there has been a unicast path vector change at node R3 it sends a pseudo label request with FEC 200, route R5, label L3 and path vector R3-R1-R4- . . . R5 to node R1.

It will be appreciated that further optimizations are available. For example if the ordered convergence is also being used for unicast, then instead of sending the path vectors multiple times for each, the unicast path vector can be obtained and used to update the forwarding tables and carry out additional steps as described above appropriately. If there is a path vector change downstream in the up traffic sense it can be notified to an up stream node in an event driven mode allowing a separate check as to where the convergence has taken place.

It will be noted that additional signaling is required according to the methods described above and optimizations to reduce the amount of signaling are available. For example the pseudo label request message and unicast vector need only be sent to "affected nodes", that is all those down stream nodes in the up traffic sense which have a nexthop change. When the request reaches a destination node where there is no nexthop change it can act as though it were the root node in as much as it sends a label mapping up traffic response. It will be seen that nodes unaffected by the change do not need to update their forwarding tables and hence additional signaling and computing time is avoided using this approach.

During the route change, the downstream node path is unaffected, downstream nodes can start using the path immediately.

It will be seen that as a result of the approaches described above looping is reduced. In particular effectively unicast routing is used to keep the base P2MP (down traffic) tree loop free, relying on ordered label distribution up stream (in the down traffic sense) through the affected nodes as a result of which convergence progresses in an ordered manner in an up stream direction. However up traffic is also acommodated in the MP2MP case as the up traffic label mappings are distributed in the opposite direction on the same tree but again corresponding to ordered convergence in the up stream direction in the up traffic sense.

Although the procedures are discussed above in relation to MP2MP trees, it will be noted that the same approach can be adapted in relation to P2MP trees simply by replacement of the pseudo label request with a standard label request message and/or ensuring that up traffic labels are not installed in the opposite direction.

The manner in which the method described herein is implemented may be in software, firmware, hardware or any combination thereof and with any appropriate cochanges as will be apparent to the skilled reader without the need for detailed description here. In particular it will be appreciated that the new signaling and label distribution approach described herein can be implemented in any appropriate manner.

4.0 Implementation Mechanisms-Hardware Overview

Figure 23:
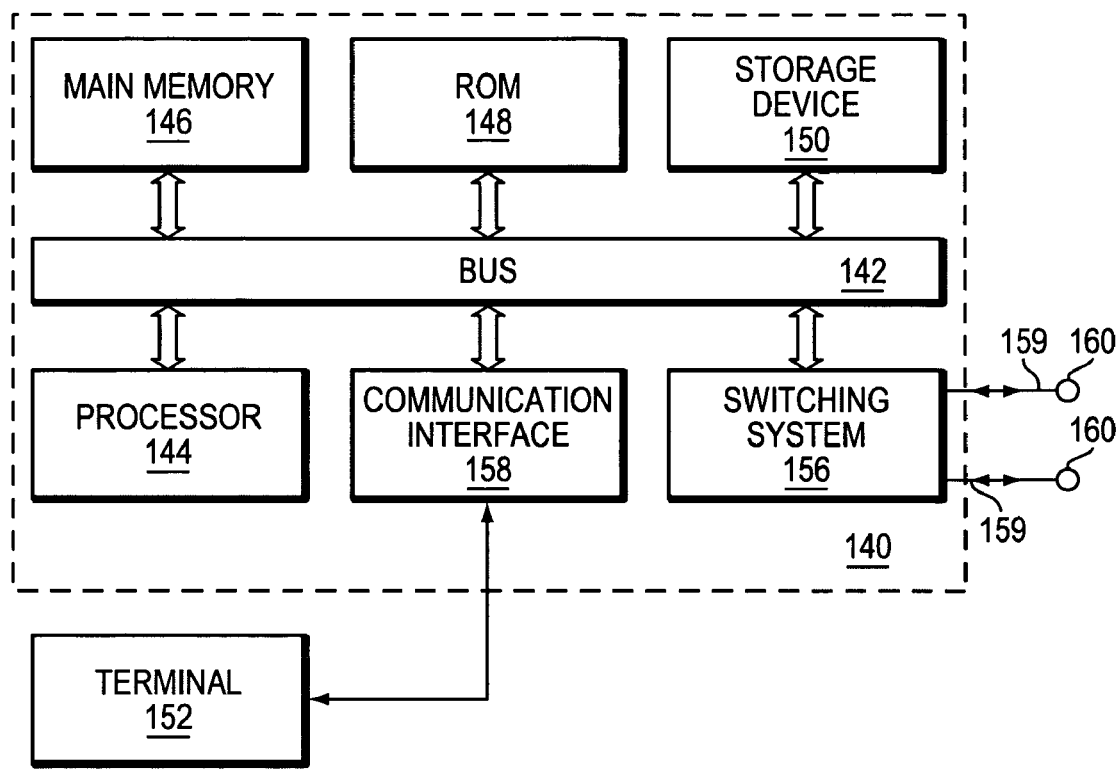
FIG. 23 is a block diagram that illustrates a computer system upon which a method for distributing labels in an LDP multicast network may be implemented.

FIG. 23 is a block diagram that illustrates a computer system 40 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a node acting as root, leaf or transit node, the above described method. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium 10 may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The method steps set out can be carried out in any appropriate order and aspects from the examples and the embodiments described juxtaposed or interchanged as appropriate the method can be applied in any network of any topology supporting multicast in relation to any component change in the network for example a link or node failure or the introduction or removal of a network component by an administrator and in relation to up or down traffic loops.

What is claimed is:

1. A method for distributing labels in a label distribution protocol multicast network having a root node and at least one leaf node, the method comprising the steps, performed at a receiving node, of:
   receiving a label and path vector from a distributing node;
   determining at least one of a loop and a convergence detection by comparing the received path vector with a path vector at the receiving node;
   in response to detecting at least one of convergence and no loops, sending a receiving node label and path vector to a nexthop node in the network; and
   withholding sending a label mapping response to the distributing node, the label mapping response including a label and path vector, until a label mapping response is received from the nexthop node.

2. The method as claimed in claim 1, further comprising the steps, performed at a distributing node, of:
   forwarding a label to a nexthop node in the network together with a path vector representing the path from the distributing node to the root node.

3. The method as claimed in claim 2, further comprising:
   updating, at the receiving node, a label forwarding table entry with the received label in response to detecting at least one of convergence and no loops.

4. The method as claimed in claim 1, further comprising the steps, performed at a destination node, of:
   receiving a label and path vector;
   determining at least one of a loop and a convergence detection by comparing the path vector received at the destination node with another path vector at the destination node; and
   in response to detecting at least one of convergence and no loops, forwarding a destination node label and path vector to a nexthop node in the network.

5. The method as claimed in claim 4, wherein the destination node is the root node.

6. The method as claimed in claim 4, wherein the nexthop of the destination node is unchanged.

7. The method is claimed in claim 4, further comprising the steps, performed at a receiving node, of:
   receiving a label and path vector from a nexthop node in the direction of the root node;
   determining at least one of a loop and a convergence detection by comparing the received path vector from the nexthop node with a path vector at the receiving node; and
   in response to detecting at least one of convergence and no loops, forwarding a receiving node label and path vector to a nexthop node in the direction away from the root node.

8. The method as claimed in claim 7, further comprising:
   updating the receiving node forwarding table in the direction towards the root node with the received label in response to detecting at least one of convergence and no loops.

9. The method as claimed in claim 1, wherein the network is one of a point to multipoint traffic (P2MP) and a multipoint to multipoint traffic (MP2MP) network.

10. The method as claimed in claim 1, wherein the receiving node is selected from a group comprising: a leaf node, a root node, and a transit node between a leaf node and a root node.

11. The method as claimed in claim 1, further comprising the steps, performed at the receiving node, of:
   updating a forwarding table in the direction away from the root with the path label at the time of sending the path label and path vector.

12. The method as claimed in claim 11, further comprising:
removing outdated forwarding information from the forwarding table at the time of sending the path label and path vector.

13. The method as claimed in claim 1, further comprising the steps, performed at the receiving node, of:
receiving a label and path vector from a nexthop node in a direction towards the root node;
determining at least one of a loop and a convergence detection using the received path vector; and
in response to detecting at least one of convergence and no loops, sending a label and path vector to a nexthop node in a direction away from the root node.

14. The method as claimed in claim 1, further comprising the steps, performed at the receiving node, of:
receiving a label and path vector from a nexthop node in a direction away from the root node;
determining at least one of a loop and a convergence detection using the received path vector; and
in response to detecting at least one of convergence and no loops, forwarding a label and path vector to a nexthop node in the direction towards the root node.

15. The method as claimed in claim 1, further comprising:
allocating a new label to a route that is distinguishable from an existing label.

16. The method as claimed in claim 1, wherein a label and path vector are forwarded by a receiving node in the event of a component change in the network.

17. An apparatus for distributing labels in a label distribution multicast network comprising:
one or more processors;
a network interface communicatively coupled to the one or more processors and configured to communicate one or more packet flows among the one or more processors in a network; and
one or more sequences of instructions for distributing labels in a label distribution protocol multicast network which, when executed by the one or more processors, cause the one or more processors to:
receive a label and path vector from a distributing node;
determine at least one of a loop and a convergence detection by comparison of the received path vector with a path vector at the apparatus;
send, in response to detection of at least one of convergence and no loops, a receiving node label and path vector to a nexthop node in the network; and
withhold sending a label mapping response to the distributing node, the label mapping response including a label and path vector, until a label mapping response is received from the nexthop node.

18. The apparatus as in claim 17 wherein the one or more sequences of instructions, when executed by the one or more processors, further cause the one or more processors to:
update a label forwarding table entry with the received label in response to detection of at least one of convergence and no loops.

19. The apparatus as in claim 17 wherein the network is one of a point to multipoint traffic (P2MP) and a multipoint to multipoint traffic (MP2MP) network.

20. The apparatus as in claim 17 wherein the apparatus is selected from a group comprising: a leaf node, a root node, and a transit node between a leaf node and a root node.

21. The apparatus as in claim 17 wherein the one or more sequences of instructions, when executed by the one or more processors, further cause the one or more processors to:
allocate a new label to a route that is distinguishable from an existing label.

* * * * *

UNITED STATES PATENT AND TRADEMARK OFFICE
CERTIFICATE OF CORRECTION

PATENT NO. : 7,684,350 B2  
APPLICATION NO. : 11/377807  
DATED : March 23, 2010  
INVENTOR(S) : Alex E. Raj Page 1 of 2

It is certified that error appears in the above-identified patent and that said Letters Patent is hereby corrected as shown below:

Col. 1, Line 22, please amend as shown:
  are sent from a source[[ is]] to a destination via a network of Col. 2, Line 14, please amend as shown:
  such as a shortest path tree[[s]] is then created providing routes to Col. 2, Line 42, please amend as shown:
  face. If the check fails then the packet is dropped. The router[[s]]

Col. 2, Line 67, please amend as shown:
  joined to node R3 via[[ transit]] respective interfaces S0, S1, S2, reference numerals Col. 3, Line 6, please amend as shown:
  obtains the relevant identifiers of the[[ tree,namely]] tree, namely the root Col. 5, Line 29, please amend as shown:
  is added and the traffic forwarded on interface S1 to node R2.

Col. 6, Line 16, please amend as shown:
  trees through a multicast core router such as router R3 then during a Signed and Sealed this Twenty-fourth Day of August, 2010

David J. Kappos
*Director of the United States Patent and Trademark Office*

Col. 7, Line 43, please amend as shown:

[[through]]thorough understanding of the present invention. It will be

Col. 10, Line 32, please amend as shown:

showing the respective forwarding tables or forwarding table portions for nodes

Col. 11, Line 4, please amend as shown:

node then all[[ as a node then all]] associated MP2MP local

Col. 13, Line 22, please amend as shown:

stream direction. However up traffic is also[[ acommodated]] accommodated in

Col. 13, Line 35, please amend as shown:

bination thereof and with any appropriate[[ cochanges]] co-changes as will

Col. 13, Line 57, please amend as shown:

of instructions to be executed by processor 144. Computer system 140

Col. 14, Line 42, please amend as shown:

tions to processor 144 for execution. Such a medium[[ 10]] may

Col. 15, Line 8, please amend as shown:

ally be stored on[[ stored on]] storage device 150 either before or